(12) United States Patent
Hotta et al.

(10) Patent No.: US 7,835,812 B2
(45) Date of Patent: Nov. 16, 2010

(54) APPARATUS FOR ASSISTING DECISIONS FOR IMPROVEMENT OF ENVIRONMENTAL LOAD

(75) Inventors: Miyako Hotta, Hitachi (JP); Norito Watanabe, Hitachi (JP); Hiroyasu Kato, Yokohama (JP); Tomoyo Aoyagi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 12/178,805

(22) Filed: Jul. 24, 2008

(65) Prior Publication Data
US 2009/0037014 A1 Feb. 5, 2009

(30) Foreign Application Priority Data
Jul. 30, 2007 (JP) ............................. 2007-196871

(51) Int. Cl.
G06F 19/00 (2006.01)
(52) U.S. Cl. .................... 700/99; 700/107; 700/111
(58) Field of Classification Search .................. 700/22, 700/28, 95, 97, 99, 100, 103, 106, 107, 108, 700/111, 286, 295; 702/182
See application file for complete search history.

(56) References Cited

U.S. PATENT DOCUMENTS

| | | | | |
|---|---|---|---|---|
| 5,852,560 | A * | 12/1998 | Takeyama et al. | 700/97 |
| 5,878,433 | A * | 3/1999 | Miyamoto | 700/106 |
| 6,691,044 | B2 * | 2/2004 | Kobayashi et al. | 700/106 |
| 6,889,163 | B2 * | 5/2005 | Hashitani et al. | 702/182 |
| 2008/0015720 | A1 * | 1/2008 | Oyasato et al. | 700/97 |

FOREIGN PATENT DOCUMENTS

JP 2002-099674 4/2002

* cited by examiner

*Primary Examiner*—Charles R Kasenge
(74) *Attorney, Agent, or Firm*—Antonelli, Terry, Stout & Kraus, LLP.

(57) ABSTRACT

An apparatus for assisting decisions for improvement of environmental loads has: environmental load per-process collecting means; proportional distributing condition per-parts storing means for storing conditions to proportionally distribute the environmental loads every parts; parts attribute storing means; manufacturing condition storing means; parts attribute calculating condition storing means for storing environmental load calculating conditions to calculate the environmental load per parts; environmental load per-parts calculating means; environmental load per-parts/process storing means for storing the environmental loads every parts/process; bill of materials (BOM) storing means; product manufacturing amount storing means; contribution degree per-product/process evaluating means for collecting the environmental loads per parts/process and calculating a contribution degree of each product to the environmental load amount of each process by multiplying the collected environmental load amount by the number of products; and environmental load distribution table per-product/process storing means.

5 Claims, 23 Drawing Sheets

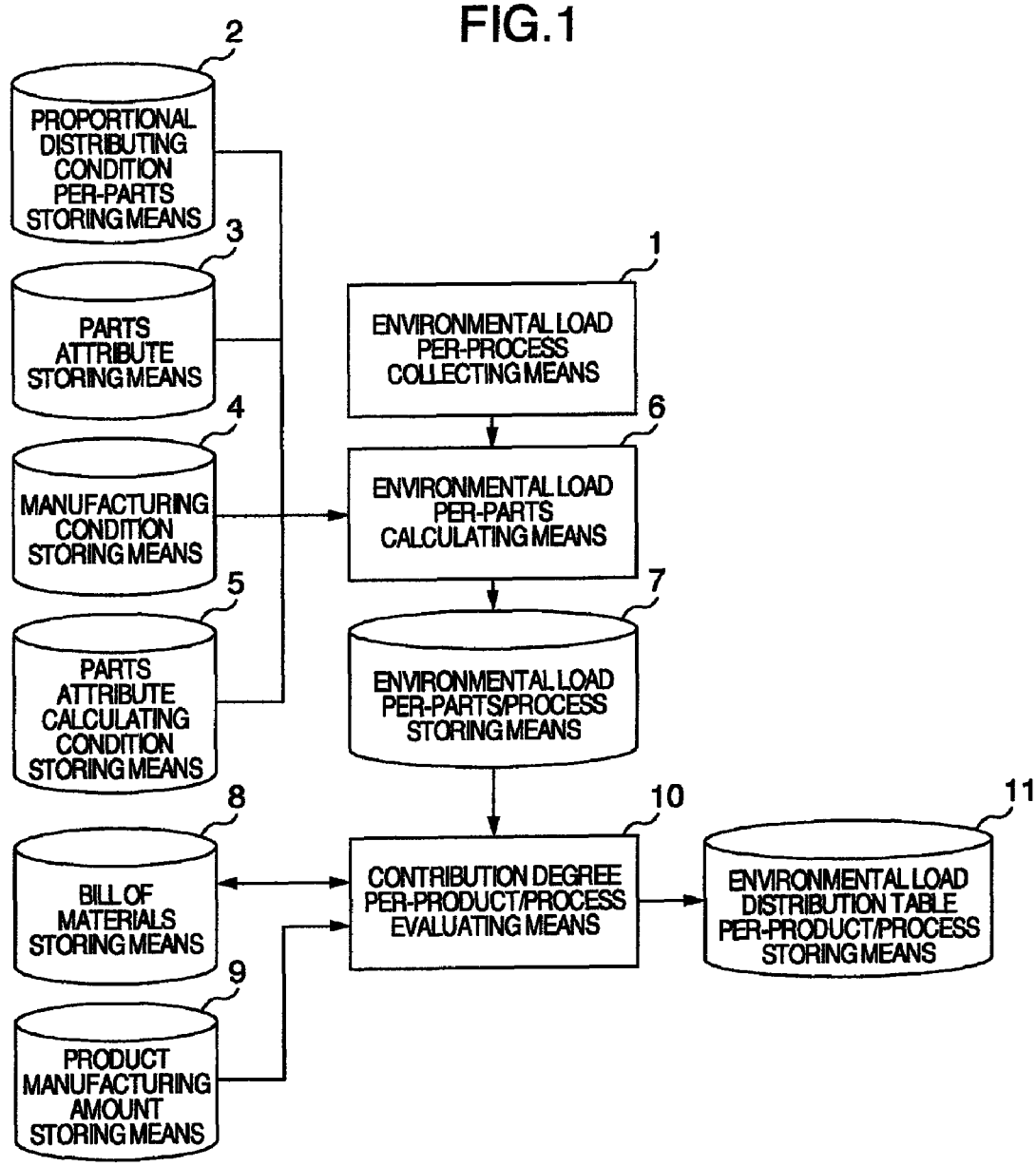

FIG.3

| ENVIRON-MENTAL LOAD \ PROCESS | STEEL CUTTING (31) | STEEL PRESS (32) | PP CUTTING (33) | PP MOLDING (34) | ASSEMBLING (35) |
|---|---|---|---|---|---|
| ELECTRIC POWER (36) | MASS | MASS | MASS | MASS | PROCESSING TIME |
| IRONSTONE (37) | – | MASS ÷ STEEL PRESS YIELD | – | – | – |

FIG.4

| PARTS \ ATTRIBUTE | MASS (kg) (41) | ASSEMBLING TIME (min) (42) | STEEL PRESS YIELD (43) |
|---|---|---|---|
| PARTS a (44) | 5 | – | MANUFACTURING CONDITION |
| PARTS b (45) | 1.5 | 1 | – |
| PARTS c (46) | 0.5 | – | – |
| PARTS d (47) | 1 | – | MANUFACTURING CONDITION |
| PARTS e (48) | 5.5 | 0.5 | – |
| PARTS f (49) | 0.8 | – | 0.8 |

FIG.5

| PARTS \ PROCESS | STEEL CUTTING (51) | STEEL PRESS (52) | PP CUTTING (53) | PP MOLDING (54) | ASSEMBLING (55) |
|---|---|---|---|---|---|
| PARTS a (56) | 45000 | 45000 | | | |
| PARTS b (57) | | | | | 5000 |
| PARTS c (58) | | | 13000 | 13000 | |
| PARTS d (59) | | 5000 | | | |
| PARTS e (5a) | | | | | 8000 |
| PARTS f (5b) | | | 5000 | | |

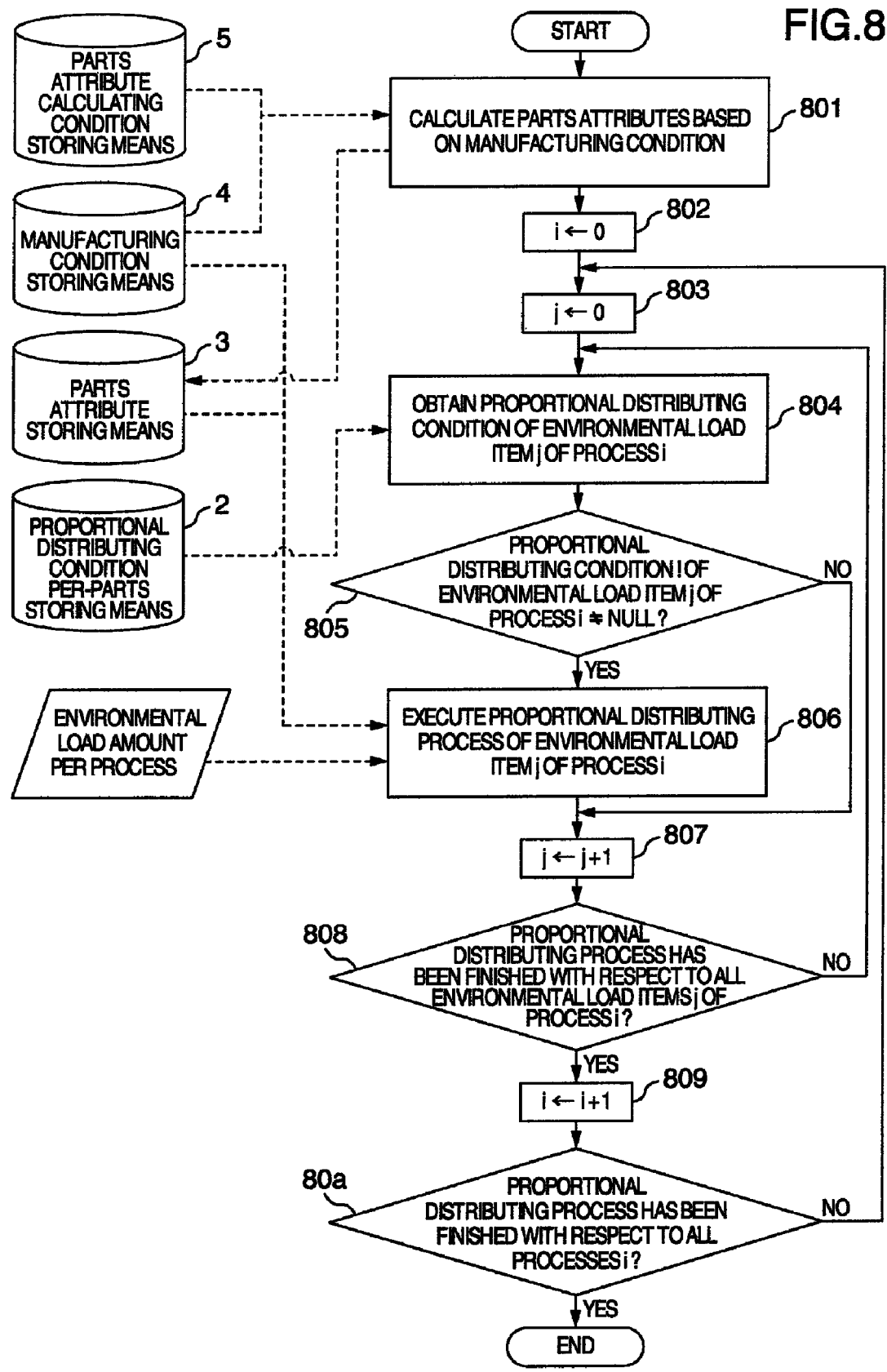

FIG. 9

| | ATTRIBUTE<br>PARTS | MASS (kg) [41] | ASSEMBLING TIME (min) [42] | STEEL PRESS YIELD [43] |
|---|---|---|---|---|
| 44 | PARTS a | 5 | – | 0.72 |
| 45 | PARTS b | 1.5 | 1 | – |
| 46 | PARTS c | 0.5 | – | – |
| 47 | PARTS d | 1 | – | 0.9 |
| 48 | PARTS e | 5.5 | 0.5 | – |
| 49 | PARTS f | 0.8 | – | 0.8 |

FIG. 10A
(ELECTRIC POWER)

| | PROCESS<br>PARTS | STEEL CUTTING [101] | STEEL PRESS [102] | PP CUTTING [103] | PP MOLDING [104] | ASSEMBLING [105] |
|---|---|---|---|---|---|---|
| 106 | PARTS a | 2 | 1.74 | – | – | – |
| 107 | PARTS b | – | – | – | – | 3.33 |
| 108 | PARTS c | – | – | 2.86 | 7.69 | – |
| 109 | PARTS d | – | 0.35 | – | – | – |
| 10a | PARTS e | – | – | – | – | 1.67 |
| 10b | PARTS f | – | – | 4.57 | – | – |

FIG. 10B
(IRONSTONE)

| | PROCESS<br>PARTS | STEEL CUTTING [10c] | STEEL PRESS [10d] | PP CUTTING [10e] | PP MOLDING [10f] | ASSEMBLING [10g] |
|---|---|---|---|---|---|---|
| 10h | PARTS a | – | 3.9 | – | – | – |
| 10i | PARTS b | – | – | – | – | – |
| 10j | PARTS c | – | – | – | – | – |
| 10k | PARTS d | – | 0.7 | – | – | – |
| 10l | PARTS e | – | – | – | – | – |
| 10m | PARTS f | – | – | – | – | – |

| PRODUCT | THE NUMBER OF PRODUCTS | |
|---|---|---|
| PRODUCT A | 5000 | 121 |
| PRODUCT B | 8000 | 122 |
| ⋮ | — | |

FIG.14
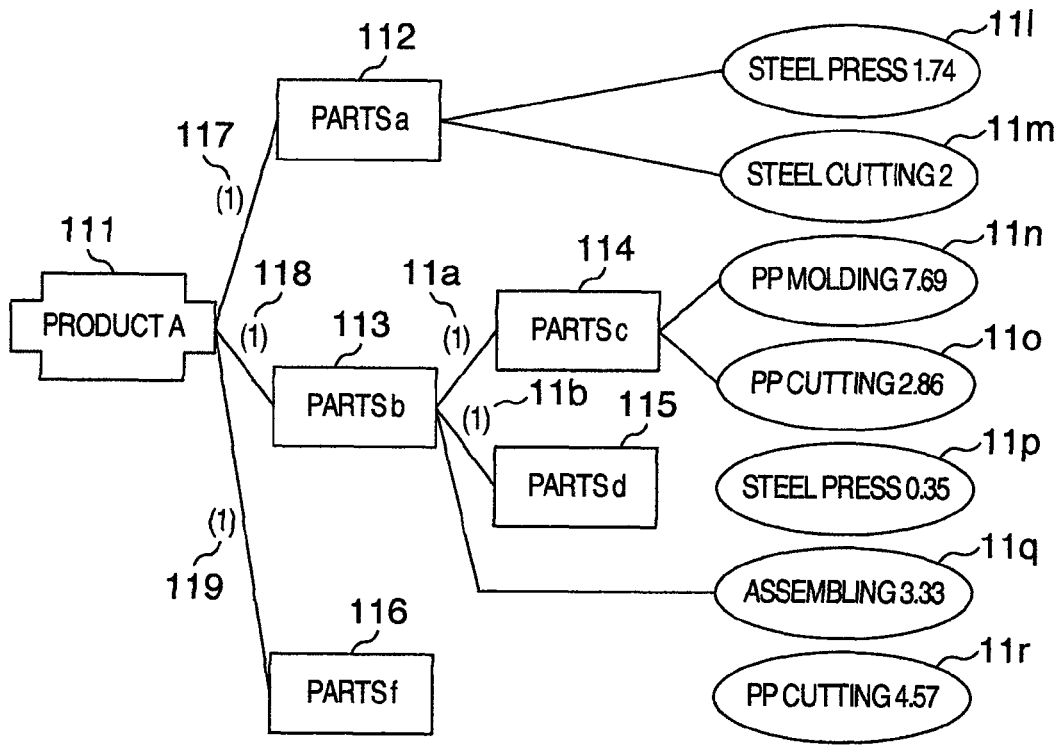
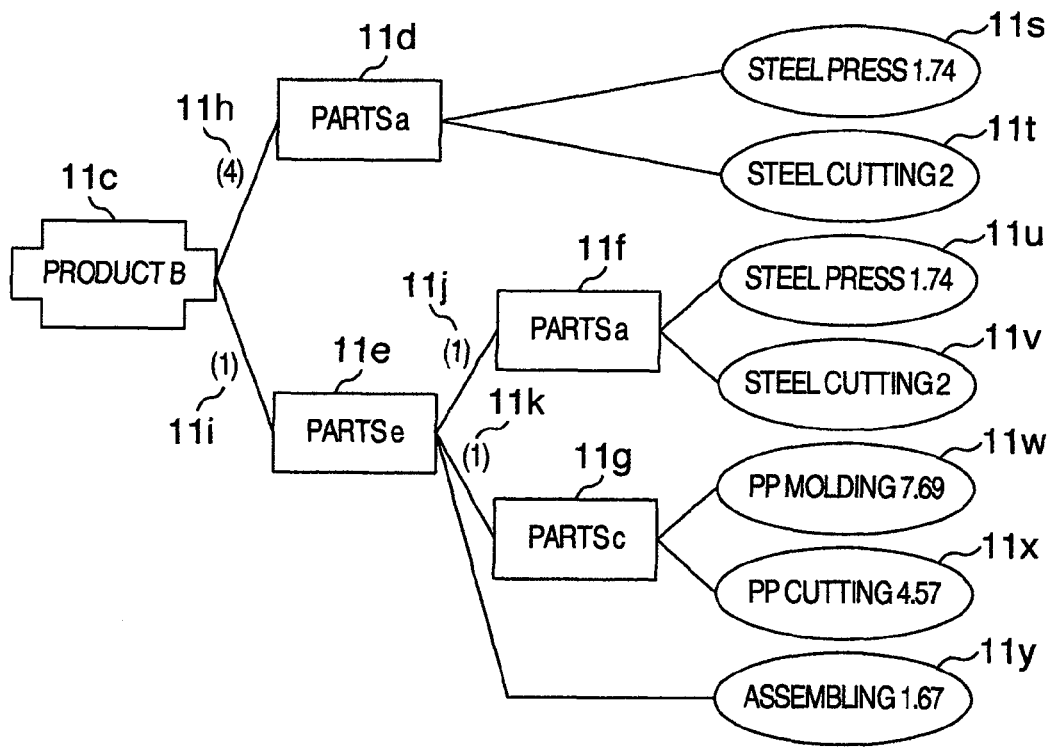

| PROCESS / PRODUCT | STEEL CUTTING | STEEL PRESS | PP CUTTING | PP MOLDING | ASSEM- BLING | PRODUCT SUM (1) | |
|---|---|---|---|---|---|---|---|
| PRODUCT A | 2 | 2.09 | 7.43 | 7.69 | 3.33 | 22.54 | ~161 |
| PRODUCT B | 10 | 8.7 | 2.86 | 7.69 | 1.67 | 30.92 | ~162 |

| PROCESS / PRODUCT | STEEL CUTTING ~174 | STEEL PRESS ~175 | PP CUTTING ~176 | PP MOLDING ~177 | ASSEM- BLING ~178 | PRODUCT SUM ~179 | |
|---|---|---|---|---|---|---|---|
| PRODUCT A | 10000 | 10450 | 37150 | 38450 | 16650 | 112700 | ~171 |
| PRODUCT B | 80000 | 69600 | 22880 | 61520 | 13360 | 247360 | ~172 |
| PROCESS SUM | 90000 | 80050 | 60030 | 99970 | 30010 | 360060 | ~173 |

FIG.18

| PROCESS / PRODUCT | STEEL CUTTING (184) | STEEL PRESS (185) | PP CUTTING (186) | PP MOLDING (187) | ASSEM-BLING (188) | PRODUCT SUM (189) | |
|---|---|---|---|---|---|---|---|
| PRODUCT A | 0.11 | 0.13 | 0.62 | 0.38 | 0.55 | 0.38 | 181 |
| PRODUCT B | 0.89 | 0.87 | 0.38 | 0.62 | 0.45 | 0.62 | 182 |
| PROCESS SUM | 0.33 | 0.30 | 0.22 | 0.37 | 0.11 | 1.00 | 183 |

FIG.19

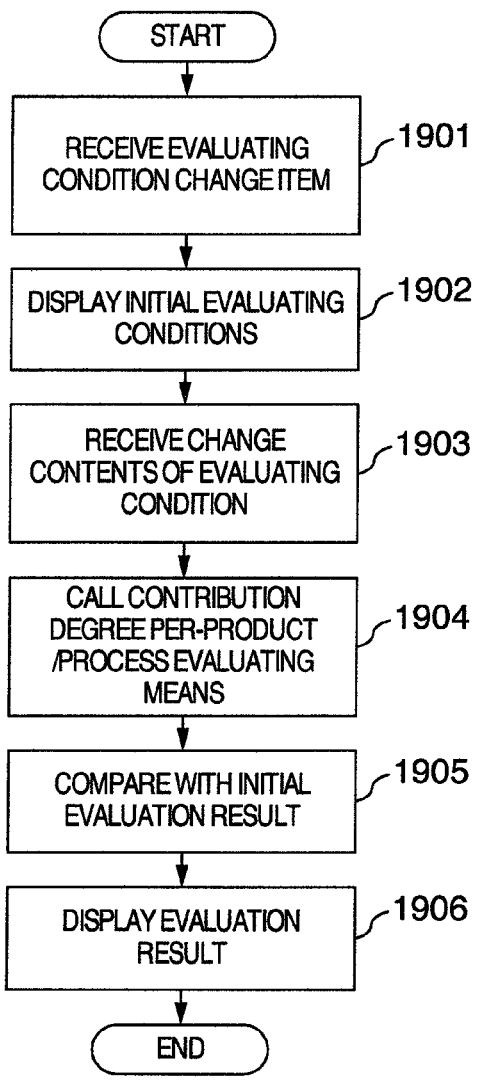

START
↓
1901 — RECEIVE EVALUATING CONDITION CHANGE ITEM
↓
1902 — DISPLAY INITIAL EVALUATING CONDITIONS
↓
1903 — RECEIVE CHANGE CONTENTS OF EVALUATING CONDITION
↓
1904 — CALL CONTRIBUTION DEGREE PER-PRODUCT /PROCESS EVALUATING MEANS
↓
1905 — COMPARE WITH INITIAL EVALUATION RESULT
↓
1906 — DISPLAY EVALUATION RESULT
↓
END

FIG.20

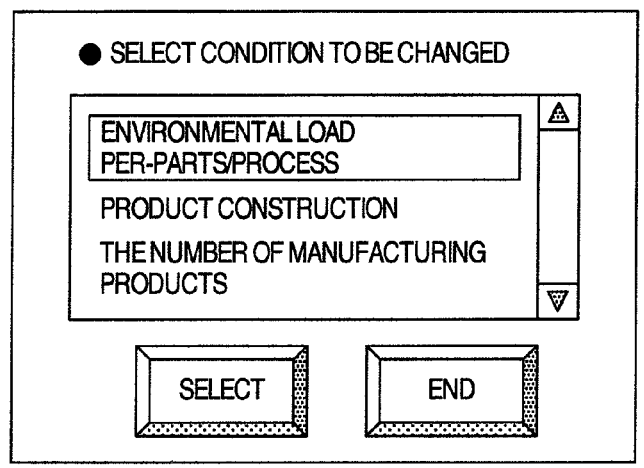

● SELECT CONDITION TO BE CHANGED

- ENVIRONMENTAL LOAD PER-PARTS/PROCESS
- PRODUCT CONSTRUCTION
- THE NUMBER OF MANUFACTURING PRODUCTS

[SELECT]  [END]

FIG.21

● ENVIRONMENTAL LOAD PER-PARTS/PROCESS

SELECT ENVIRONMENTAL LOAD ITEM [ELECTRIC POWER ▽] ~211

SELECT AND EDIT CELL WHOSE VALUE IS CHANGED

| PROCESS / PARTS | STEEL CUTTING | STEEL PRESS | PP CUTTING | PP MOLDING | ASSEM-BLING |
|---|---|---|---|---|---|
| PARTS a | 2 | 1.74 | – | – | – |
| PARTS b | – | – | – | – | 3.33 |
| PARTS c | – | – | 2.86 | 7.69 | – |
| PARTS d | – | 0.35 | – | – | – |
| PARTS e | – | – | – | – | 1.67 |
| PARTS f | – | – | 4.57 | – | – |

VALUE AFTER CHANGE [1.5] ~213    [CHANGE] ~214

| PROCESS / PRODUCT | STEEL CUTTING | STEEL PRESS | PP CUTTING | PP MOLDING | ASSEM-BLING | PRODUCT SUM (1) |
|---|---|---|---|---|---|---|
| PRODUCT A | 2 | 1.85 | 7.43 | 7.69 | 3.33 | 22.3 |
| PRODUCT B | 10 | 7.5 | 2.86 | 7.69 | 1.67 | 29.72 |

FIG.23

| PROCESS / PRODUCT | STEEL CUTTING | STEEL PRESS | PP CUTTING | PP MOLDING | ASSEM-BLING | PRODUCT SUM |
|---|---|---|---|---|---|---|
| PRODUCT A | 10000 | 9250 | 37150 | 38450 | 16650 | 111500 |
| PRODUCT B | 80000 | 60000 | 22880 | 61520 | 13360 | 237760 |
| PROCESS SUM | 90000 | 69250 | 60030 | 99970 | 30010 | 349260 |

FIG.24

| PROCESS / PRODUCT | STEEL CUTTING | STEEL PRESS | PP CUTTING | PP MOLDING | ASSEM-BLING | PRODUCT SUM |
|---|---|---|---|---|---|---|
| PRODUCT A | 0.11 | 0.13 | 0.62 | 0.38 | 0.55 | 0.32 |
| PRODUCT B | 0.89 | 0.87 | 0.38 | 0.62 | 0.45 | 0.68 |
| PROCESS SUM | 0.26 | 0.20 | 0.17 | 0.29 | 0.09 | 1.00 |

● ENVIRONMENTAL LOAD AMOUNT PER PRODUCT/PROCESS
RESULT DISPLAYING METHOD

| PRODUCT DISTRIBUTION TABLE  | | | |  | | |
|---|---|---|---|---|---|---|
| PROCESS / PRODUCT | STEEL CUTTING | STEEL PRESS | PP CUTTING | PP MOLDING | ASSEM-BLING | PRODUCT SUM (1) |
| PRODUCT A | 2 | 1.85 | 7.43 | 7.69 | 3.33 | 22.3 |
| PRODUCT B | 10 | 7.5 | 2.86 | 7.69 | 1.67 | 29.72 |

252

● ENVIRONMENTAL LOAD AMOUNT PER PRODUCT/PROCESS
RESULT DISPLAYING METHOD

| PRODUCT DISTRIBUTION TABLE  | | | INITIAL VALUE · EVALUATION VALUE  | | | |
|---|---|---|---|---|---|---|
| PROCESS / PRODUCT | STEEL CUTTING | STEEL PRESS | PP CUTTING | PP MOLDING | ASSEM-BLING | PRODUCT SUM |
| PRODUCT A | 10000 / 10000 | 10450 / ▽9250 | 37150 / 37150 | 38450 / 38450 | 16650 / 16650 | 112700 / ▽111500 |
| PRODUCT B | 80000 / 80000 | 69600 / ▽60000 | 22880 / 22880 | 61520 / 61520 | 13360 / 13360 | 247360 / ▽237760 |
| PROCESS SUM | 90000 / 90000 | 80050 / ▽69250 | 60030 / 60030 | 99970 / 99970 | 30010 / 30010 | 360060 / ▽349260 |

253

254

● ENVIRONMENTAL LOAD AMOUNT PER PRODUCT/PROCESS
RESULT DISPLAYING METHOD

| PRODUCT DISTRIBUTION TABLE  | | | INCREASE/DECREASE RATE  | | | |
|---|---|---|---|---|---|---|
| PROCESS / PRODUCT | STEEL CUTTING | STEEL PRESS | PP CUTTING | PP MOLDING | ASSEM-BLING | PRODUCT SUM |
| PRODUCT A | 0.00 | ▽0.11 | 0.00 | 0.00 | 0.00 | ▽0.01 |
| PRODUCT B | 0.00 | ▽0.14 | 0.00 | 0.00 | 0.00 | ▽0.04 |
| PROCESS SUM | 0.00 | ▽0.13 | 0.00 | 0.00 | 0.00 | ▽0.03 |

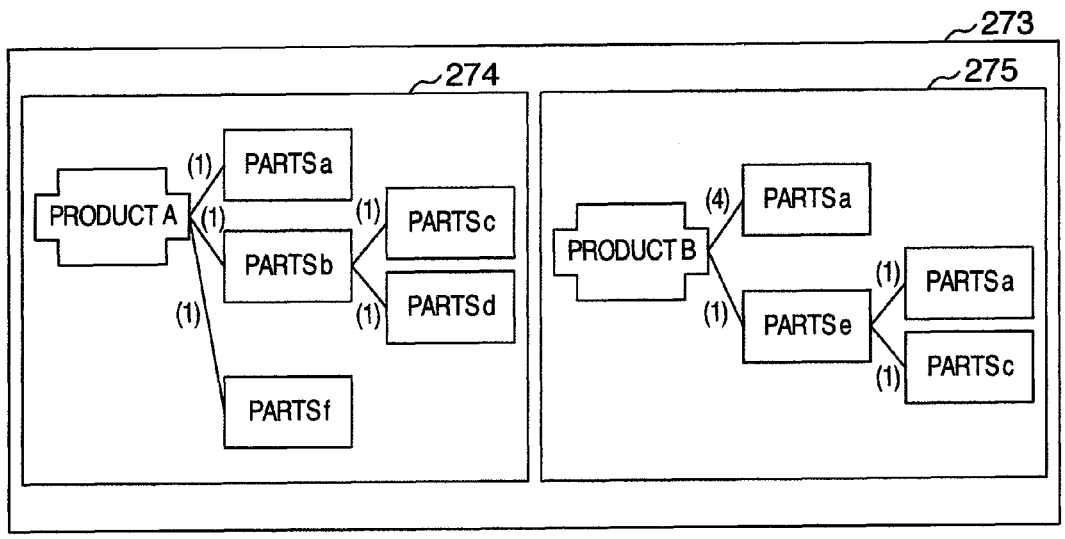

| PROCESS / PARTS | STEEL CUTTING | STEEL PRESS | PP CUTTING | PP MOLDING | ASSEM-BLING |
|---|---|---|---|---|---|
| PARTSa | a1 | a2 | – | – | – |
| PARTSb | – | – | – | – | b5 |
| PARTSc | – | – | c3 | c4 | – |
| PARTSd | – | d2 | – | – | – |
| PARTSe | – | – | – | – | e5 |
| PARTSf | – | – | f3 | – | – |

271

272

|  | THE NUMBER OF MANU-FACTURING PRODUCTS |
|---|---|
| PRODUCT A | Na |
| PRODUCT B | Nb |
| ⋮ | – |

| PROCESS / PRODUCT | STEEL CUTTING | STEEL PRESS | PP CUTTING | PP MOLDING | ASSEM-BLING | PRODUCT SUM (PER PRODUCT) |
|---|---|---|---|---|---|---|
| PRODUCT A | Na*a1 | Na*(a2+d2) | Na*(c3+f3) | Na*c4 | Na*b5 | a1+a2+d2+c3+f3+c4+b5 |
| PRODUCT B | Nb*a1*5 | Nb*a2*5 | Nb*c3 | Nb*c4 | Nb*e5 | 5*a1+5*a2+c3+c4+e5 |
| PROCESS SUM | a1*(Na+5*Nb) | a2*(Na+5*Nb)+d2*Na | c3*(Na+Nb)+f3*Na | c4*(Na+Nb) | b5*Na+e5*Nb | Na*(a1+a2+d2+c3+f3+c4+b5)+Nb*(5*a1+5*a2+c3+c4+e5) |

FIG.31

| PROCESS / PRODUCT | STEEL CUTTING | STEEL PRESS | PP CUTTING | PP MOLDING | ASSEM-BLING | PRODUCT SUM |
|---|---|---|---|---|---|---|
| PRODUCT A | Na*a1 | Na*(a2+d2) | Na*(c3+f3) | Na*c4 | Na*b5 | a1+a2+d2+c3+f3+c4+b5 |
| PRODUCT B | Nb*a1*5 | Nb*a2*5 | Nb*c3 | Nb*c4 | Nb*e5 | 5*a1+5*a2+c3+c4+e5 |
| PROCESS SUM | a1*(Na+5*Nb) | a2*(Na+5*Nb)+d2*Na | c3*(Na+Nb)+f3*Na | c4*(Na+Nb) | b5*Na+e5*Nb | ... |

311 → BELOW 80000
312 → BELOW 89970
313 → BELOW 25

FIG.32

| PROCESS / PARTS | STEEL CUTTING | STEEL PRESS | PP CUTTING | PP MOLDING | ASSEM-BLING |
|---|---|---|---|---|---|
| PARTS a | 2 | 1.74 | – | – | – |
| PARTS b | – | – | – | – | 3.33 |
| PARTS c | – | – | 2.86 | 7.69 | – |
| PARTS d | – | 0.35 | – | – | – |
| PARTS e | – | – | – | – | 1.67 |
| PARTS f | – | – | 4.57 | – | – |

FIG.35

● OPTIMIZATION RESULT — 352
OBJECTIVE FUNCTION 2.83

| ENVIRONMENTAL LOAD PER PARTS /PROCESS ▽ | | | OPTIMUM VALUE ▽ | | |
|---|---|---|---|---|---|
| PROCESS / PARTS | STEEL CUTTING | STEEL PRESS | PP CUTTING | PP MOLDING | ASSEMBLING |
| PARTS a | 0.97 | 1.74 | – | – | – |
| PARTS b | – | – | – | – | 3.33 |
| PARTS c | – | – | 2.86 | 6.92 | – |
| PARTS d | – | 0.35 | – | – | – |
| PARTS e | – | – | – | – | 1.67 |
| PARTS f | – | – | 4.57 | – | – |

● OPTIMIZATION RESULT
OBJECTIVE FUNCTION 2.83

| ENVIRONMENTAL LOAD PER PARTS /PROCESS ▽ | | | INITIAL VALUE · OPTIMUM VALUE ▽ | | |
|---|---|---|---|---|---|
| PROCESS / PARTS | STEEL CUTTING | STEEL PRESS | PP CUTTING | PP MOLDING | ASSEMBLING |
| PARTS a | ▽ 2 / 0.97 | 1.74 / 1.74 | – | – | – |
| PARTS b | – | – | – | – | 3.33 / 3.33 |
| PARTS c | – | – | 2.86 / 2.86 | 7.69 / ▽ 6.92 | – |
| PARTS d | – | 0.35 / 0.35 | – | – | – |
| PARTS e | – | – | – | – | 1.67 / 1.67 |
| PARTS f | – | – | 4.57 / 4.57 | – | – |

● OPTIMIZATION RESULT
OBJECTIVE FUNCTION 0.814

| ENVIRONMENTAL LOAD PER PARTS /PROCESS ▽ | | | REDUCTION AMOUNT · REDUCTION RATIO ▽ | | |
|---|---|---|---|---|---|
| PROCESS / PARTS | STEEL CUTTING | STEEL PRESS | PP CUTTING | PP MOLDING | ASSEMBLING |
| PARTS a | 1.03 (0.515) | 0 (0) | – | – | – |
| PARTS b | – | – | – | – | 0 (0) |
| PARTS c | – | – | 0 (0) | 0.77 (0.1) | – |
| PARTS d | – | 0 (0) | – | – | – |
| PARTS e | – | – | – | – | 0 (0) |
| PARTS f | – | – | 0 (0) | – | – |

FIG.36

● OPTIMIZATION RESULT
OBJECTIVE FUNCTION 2.83

| DISTRIBUTION TABLE PER PRODUCT ▼ | INITIAL VALUE · OPTIMUM VALUE ▼ |

| PROCESS / PRODUCT | STEEL CUTTING | STEEL PRESS | PP CUTTING | PP MOLDING | ASSEM-BLING | PRODUCT SUM (1) |
|---|---|---|---|---|---|---|
| PRODUCT A | 2 ▽0.97 | 2.09 2.09 | 7.43 7.43 | 7.69 ▽6.92 | 3.33 3.33 | 22.54 ▽20.74 |
| PRODUCT B | 10 ▽4.85 | 8.7 8.7 | 2.86 2.86 | 7.69 ▽6.92 | 1.67 1.67 | 30.92 ▽25 |

<=25

● OPTIMIZATION RESULT
OBJECTIVE FUNCTION 2.83

| DISTRIBUTION TABLE PER PROCESS ▼ | OPTIMUM VALUE · REDUCTION RATIO ▼ |

| PROCESS / PRODUCT | STEEL CUTTING | STEEL PRESS | PP CUTTING | PP MOLDING | ASSEM-BLING | PRODUCT SUM (1) |
|---|---|---|---|---|---|---|
| PRODUCT A | 4850 ▽0.515 | 10450 0 | 37150 0 | 34600 ▽0.1 | 16650 0 | 98850 ▽0.11 |
| PRODUCT B | 38800 ▽0.515 | 69600 0 | 22880 0 | 55360 ▽0.1 | 13360 0 | 161200 ▽0.32 |
| PROCESS SUM | 43650 ▽0.515 | 80050 0 | 60030 0 | 89960 ▽0.1 | 30010 0 | 260050 ▽0.26 |

| PROCESS / PARTS | STEEL CUTTING | STEEL PRESS | PP CUTTING | PP MOLDING | ASSEMBLING |
|---|---|---|---|---|---|
| PARTS a | Ca1 | Ca2 | – | – | – |
| PARTS b | – | – | – | – | Cb5 |
| PARTS c | – | – | Cc3 | Cc4 | – |
| PARTS d | – | Cd2 | – | – | – |
| PARTS e | – | – | – | – | Ce5 |
| PARTS f | – | – | Cf3 | – | – |

FIG.38

| PROCESS / PARTS | STEEL CUTTING | STEEL PRESS | PP CUTTING | PP MOLDING | ASSEMBLING |
|---|---|---|---|---|---|
| PARTS a | 2 | 3 | – | – | – |
| PARTS b | – | – | – | – | 0.02 |
| PARTS c | – | – | 0.5 | 1 | – |
| PARTS d | – | 0.6 | – | – | – |
| PARTS e | – | – | – | – | 0.1 |
| PARTS f | – | – | 1 | – | – |

APPARATUS FOR ASSISTING DECISIONS FOR IMPROVEMENT OF ENVIRONMENTAL LOAD

BACKGROUND OF THE INVENTION

The invention relates to an apparatus for assisting decisions for improvement of environmental loads in a life cycle of a product.

According to efforts toward management and improvement of environmental loads of a manufacturing industry in the related arts, it is a present situation that a grasp of an amount of environmental loads caused by manufacturing activities in order to write it onto an environment report and a life cycle assessment (LCA) per product are independently executed. Although the environmental loads of the manufacturing activities are closely related to a manufacturing schedule such as the number of manufactured products or the like, since a link of the environmental loads between the product and a process of the manufacturing activities is not established, it is a present situation that a schedule to reduce the environmental loads in consideration of future manufacturing schedule and product strategy cannot be made.

According to an environmental load information system disclosed in JP-A-2002-99674, in each step (process) of the enterprise activities, environmental load information is individually collected, the collected environmental load information is analyzed, and environmental loads and the like per step, per base station, and per product are obtained and provided for discrimination about management.

In Patent Document 1 (JP-A-2002-99674), there has been disclosed such a technique that information collected from a manufacturing information system for collecting environmental load information in manufacturing steps is processed and environmental loads which are caused by manufacturing a product is obtained every product. With respect to indirect environmental loads, there has also been disclosed such a technique that they are proportionally distributed per product in accordance with a using situation (area ratio) of a building per product and a ratio of the number of persons in charge which have been obtained from a management system information system.

In the actual manufacturing site, however, in the case of presuming, particularly, a manufacturing industry of an assembling system, ordinarily, a plurality of parts and products are manufactured by one manufacturing process or common parts exist among different products. It is a problem that in such a situation where the parts constructing the product and their processes are not independent every product as mentioned above, how the environmental load per product is calculated from the environmental loads of each manufacturing process.

Further, nothing is considered with respect to a method of making an environmental load reducing schedule in consideration of a manufacturing schedule on the assumption that a link between the manufacturing activities and the environmental loads of the product has been established.

SUMMARY OF THE INVENTION

It is a first object of the invention, therefore, to provide an apparatus for assisting decisions for improvement of environmental loads which can obtain an environmental load contribution degree per product on the basis of the environmental loads collected every process.

It is a second object of the invention to provide an apparatus for assisting decisions for improvement of environmental loads, in which in order to assist making of a schedule for reducing environmental loads in consideration of a manufacturing schedule, environmental loads of a whole business, a whole product, and a whole process in the case where the number of products to be manufactured is changed or the environmental load of the process is improved are obtained, and a reduction amount of the environmental loads per parts/process which needs to be reduced can be obtained in the case where an upper limit is set into an environmental load amount.

According to an embodiment of the invention, there is provided an apparatus for assisting decisions for improvement of environmental loads, comprising:

environmental load per-process collecting means (1) for collecting an environmental load amount per process;

parts attribute storing means (3) for storing parts-peculiar attributes including mass and a yield when a parts is manufactured;

proportional distributing condition per-parts storing means (2) for storing the parts-peculiar attributes, as a proportional distributing condition, adapted to proportionally distribute, every parts, the environmental load amount per process collected by the environmental load per-process collecting means (1);

manufacturing condition storing means (4) for storing manufacturing conditions constructed by a manufacturing amount per parts of each process in correspondence to the collecting period of time of the environmental load amount in the environmental load per-process collecting means (1);

parts attribute calculating condition storing means (5) for storing calculating conditions of the parts attributes which are decided by a combination of the parts to be manufactured among the manufacturing conditions;

environmental load per-parts calculating means (6) for calculating the environmental load amount per parts on the basis of the environmental load amount per process which is inputted from the environmental load per-process collecting means (1), the proportional distributing conditions per parts stored in the proportional distributing condition per-parts storing means (2), the attributes of the parts stored in the parts attribute storing means (3), the manufacturing conditions regarding the parts stored in the manufacturing condition storing means (4), and the parts attribute calculating conditions stored in the parts attribute calculating condition storing means (5);

environmental load per-parts/process storing means (7) for storing the environmental load amount calculated by the environmental load per-parts calculating means every process of each parts;

bill of materials (BOM) storing means (8) for storing a bill of materials (BOM) which specifies a parts construction of the product and the process which is made to correspond to each parts;

product manufacturing amount storing means (9) for storing a manufacturing amount of the products manufactured for a same period of time during which the environmental loads per process have been collected;

contribution degree per-product/process evaluating means (10) for collecting the environmental load amount of a product unit every product/process on the basis of the environmental loads per-parts/process stored in the environmental load per-parts/process storing means, the bill of materials (BOM) stored in the BOM storing means, and the product manufacturing amount stored in the product manufacturing amount storing means and calculating a contribution degree of each product to the environmental load amount of each process by multiplying the collected environmental load amount by the number of products; and environmental load distribution table per-product/process storing means (11) for storing an environmental load distribution table per process every product which has been evaluated by the contribution degree per-product/process evaluating means (10).

According to the embodiment of the invention, the apparatus further has evaluating condition setting means (12) for changing each data which is input data of the contribution degree per-product/process evaluating means (10) and is stored in the environmental load per-parts/process storing means (7), the bill of materials storing means (8), and the product manufacturing amount storing means (9), evaluating the changed data again by the contribution degree per-product/process evaluating means (10), and evaluating the environmental load amount after the data change and the contribution degree of the environmental loads to the whole process again.

According to the embodiment of the invention, in the case where target values for reduction of the environmental loads of the whole product, the whole process, and the whole business are set, the apparatus further has reduction target calculating means (13) for calculating necessary reduction amounts with respect to the environmental loads per parts/process and the environmental loads per product/process in order to accomplish the object for reduction.

By using the invention, the contribution degree of each product can be calculated to the environmental loads collected every process. The environmental load reducing schedule can be made in consideration of the manufacturing schedule.

Other objects, features and advantages of the invention will become apparent from the following description of the embodiments of the invention taken in conjunction with the accompanying drawings.

BRIEF DESCRIPTION OF THE DRAWINGS

FIG. 1 is a constructional diagram of an embodiment of an apparatus for assisting decisions for improvement of environmental loads according to the invention;

FIG. 2 shows an example of environmental loads per process which have been measured by environmental load per-process collecting means;

FIG. 3 shows an example of contents stored in proportional distributing condition per-parts storing means;

FIG. 4 shows an example of items stored in parts attribute storing means;

FIG. 5 shows an example of items stored in manufacturing condition storing means;

FIG. 8 is a flowchart for describing a flow for processes of environmental load per-parts calculating means;

FIG. 9 is a diagram showing a state of the parts attribute storing means after parts attributes were calculated;

FIGS. 10A and 10B show examples of items stored in environmental load per-parts/process storing means;

FIG. 14 is a diagram for describing a bill of materials (BOM) to which processes have been made to correspond;

FIG. 18 is a diagram showing a result of calculation of a contribution degree per product;

FIG. 19 is a flowchart showing a flow for processes of evaluating condition setting means;

FIG. 20 shows an example of an input display screen adapted to receive selection of a change item of evaluating conditions;

FIG. 21 shows an example of an input display screen adapted to receive change contents of evaluating conditions;

FIG. 22 shows an example of a distribution table of each product of an environmental load distribution table after the evaluating conditions were changed;

FIG. 23 shows an example of a distribution table of each process of the environmental load distribution table after the evaluating conditions were changed;

FIG. 24 shows an example of a distribution table of the contribution degree of the environmental load distribution table after the evaluating conditions were changed;

FIG. 25 shows an example of a display screen showing a result of comparison with an evaluation result under initial conditions;

FIG. 27 is a diagram for describing a creation of a function showing the environmental loads;

FIG. 31 shows an example for describing setting contents of constraints;

FIG. 32 shows an example of initial values of environmental loads per parts/process;

FIG. 35 is a diagram showing an example of a display screen of a result of processes of the reduction target calculating means;

FIG. 36 is a diagram showing another example of a display screen of a result of processes of the reduction target calculating means;

FIG. 37 shows an example of storage of environmental load reduction costs of every part and every process; and FIG. 38 shows a specific example of the environmental load reduction costs of every part and every process.

DESCRIPTION OF THE EMBODIMENTS

Figures 6, 7:
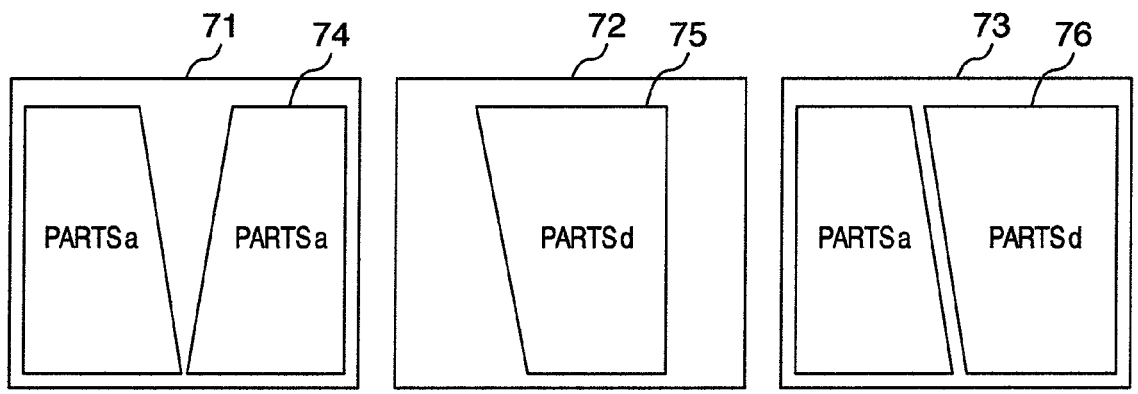
FIG. 6 shows an example of parts attribute calculating conditions.
FIG. 7 is a diagram for describing examples of combination of parts.

An embodiment of an apparatus for assisting decisions for improvement of environmental loads will be described hereinbelow with reference to the drawings.

Embodiment 1

FIG. 1 is a block diagram showing a construction of the first embodiment of the apparatus for assisting the decisions for improvement of the environmental loads according to the invention. The apparatus for assisting the decisions for improvement of the environmental loads of FIG. 1 has: environmental load per-process collecting means 1 for collecting environmental loads every process; proportional distributing condition per-parts storing means 2 for storing proportional distributing conditions adapted to proportionally distribute, every parts, the environmental loads collected by the environmental load per-process collecting means 1; parts attribute storing means 3 for storing parts-peculiar attributes such as mass, a yield when a part is manufactured from material, and the like; manufacturing condition storing means 4 for storing manufacturing conditions such as manufacturing amount per parts corresponding to a collecting period of time of each process, combination of different parts which are simultaneously manufactured, and the like in correspondence to a collecting period of time of the environmental load per-process collecting means 1; and parts attribute calculating condition storing means 5 for storing environmental load calculating conditions adapted to calculate the environmental loads per parts from the manufacturing conditions stored in the manufacturing condition storing means 4.

The apparatus also has: environmental load per-parts calculating means 6 for calculating the environmental load amount per parts on the basis of the information stored in the environmental load per-process collecting means 1, proportional distributing condition per-parts storing means 2, parts attribute storing means 3, manufacturing condition storing means 4, and parts attribute calculating condition storing means 5; and environmental load per-parts/process storing means 7 for storing, every parts/process, the environmental loads calculated by the environmental load per-parts calculating means 6.

The apparatus further has: bill of materials storing means 8 for storing a bill of materials (BOM) which can specify a parts construction of the product and the process linked to each parts; product manufacturing amount storing means 9 for storing a manufacturing amount of the products manufactured for a same period of time during which the environmental loads per process have been collected; contribution degree per-product/process evaluating means 10 for collecting the environmental loads every product/process on the basis of the information stored in the environmental load per-parts/process storing means 7, BOM storing means 8, and product manufacturing amount storing means 9 and multiplying the collected environmental loads by the number of products, thereby calculating a contribution degree of each product to the environmental load amount of each process; and environmental load distribution table per-product/process storing means 11 for storing an environmental load distribution table per process every product which has been evaluated by the contribution degree per-product/process evaluating means 10.

The component elements of the first embodiment will be sequentially described. Although a construction of the product, its process, values of the environmental loads, and the like are shown as examples for explanation, it is assumed that all of them are imaginary ones.

As kinds of environmental loads which are collected by the environmental load per-process collecting means 1, there are three kinds and 20 items or more such as items classified into consumption of resources such as crude oil, water, and the like, items such as $CO_2$, $SO_x$, and the like emitted into the atmosphere, and items such as BOD and COD which are emitted into the hydrosphere. However, with respect to all or a part of the environmental load items, an environmental load amount is collected every process in accordance with an object. For example, as for an electric power amount, an electric power amount per unit time is measured by using an energy meter or the like and recorded. An example of the environmental loads per process which have been measured in this manner is shown in FIG. 2. In the diagram, rows 21 and 22 denote environmental load amounts in each process of every environmental load item. The row 21 indicates a consumption amount of the electric power and the row 22 indicates a consumption amount of the ironstone among the environmental load items. Columns 23 to 27 indicate processes. For example, the column 23 indicates, every environmental load item, an environmental load which is consumed in a whole "steel cutting" process. For example, in the "steel cutting" process of the column 23, there is a case where the environmental load amount does not exist in dependence on a combination of the environmental load item and the process, such as a case where although an electric power of 90000 kwh is generated as an environmental load of the environmental load item "electric power", the environmental load does not occur in the environmental load item "ironstone", or the like.

It is assumed that those values of the environmental load amounts have been collected per unit time and per unit period of time. Although only the environmental loads for one period of time are shown in the example of FIG. 2, the environmental load amounts may be stored with respect to a plurality of periods of time by providing a different table for every period. Or, it is also possible to construct in such a manner that one table is provided for each environmental load item, a row is added every period, and the environmental load amount is stored.

The proportional distributing condition per-parts storing means 2 is means for storing the proportional distributing conditions adapted to proportionally distribute, every parts, the environmental load amount per process. An example of the proportional distributing condition per-parts storing means 2 is shown in FIG. 3. Columns 31 to 35 denote examples of the process for proportionally distributing the environmental load amount. Rows 36 and 37 denote examples of the environmental load item. In the embodiment, "electric power" of the row 36 and "ironstone" of the row 37 are mentioned as examples. For example, with respect to a "steel cutting" process of the column 31, when the environmental load item among the environmental loads collected by the environmental load per-process collecting means 1 is "electric power", the environmental load amount is proportionally distributed every product by using a parts attribute "mass" in the column 31. With respect to an "assembling" process of the column 35, the environmental load amount is proportionally distributed every product by using a parts attribute "processing time" in row 36.

The parts attribute storing means 3 is means for storing parts attributes which are unconditionally determined by specifying the parts. An example of the items stored in the parts attribute storing means 3 is shown in FIG. 4. Columns 41 to 43 indicate values of parts attributes for each parts. The column 41 indicates mass of parts, the column 42 indicates a processing time required to assemble the parts, and the column 43 indicates a yield which is obtained in the case where the parts have been steel-press processed, respectively. Although the three kinds of parts attributes have been shown as examples here, the number of kinds of parts attributes is not limited to such a value. The parts attributes of the columns 41 to 43 are stored every parts of rows 44 to 49. For example, with respect to a parts b of a row 45, since a "steel press" process is not included in the manufacturing steps, "steel press yield" is not set or the like. In this manner, the unnecessary attributes are not set. As shown in the rows 44 and 47 of the column 43, with respect to parts in which "manufacturing conditions" have been stored, the attribute per parts is calculated on the basis of the manufacturing conditions of each parts and its value is obtained.

The manufacturing condition storing means 4 is means for storing manufacturing conditions and the like which are obtained from, for example, an MES (Manufacturing Execution System) or the like every process. In the embodiment, the number of manufactured products is used as a manufacturing condition. An example of the items stored in the manufacturing condition storing means 4 is shown in FIG. 5. The number of parts processed by the process is shown every process. Columns 51 to 55 correspond to processes. Rows 56 to 59 and rows 5a and 5b correspond to parts. For example, it will be understood from values of the column 51 and the row 56 that 45000 parts (a) have been processed in the "steel cutting" process. It will be understood from values of the rows 56 and 59 of the column 52 and that 45000 parts (a) have been processed and 5000 parts (d) have been processed in the "steel press" process. The data which is stored in the manufacturing condition storing means 4 is synchronized with the unit time and the unit period of time for which the environmental loads are collected by the environmental load per-process collecting means 1. For example, in the case where the information of the first to 31st days every month is collected as a unit period of time by the environmental load per-process collecting means 1, the manufacturing condition of the period of time of the first to 31st days every month is also stored as a unit period of time in the manufacturing condition storing means 4.

The parts attribute calculating condition storing means 5 is means for storing conditions adapted to calculate the values of the attributes such as manufacturing conditions or the like which are determined in consideration of other factors instead of the attribute which is unconditionally decided by the decision of the parts among the parts attributes which are stored in the parts attribute storing means 3.

An example of the parts attribute calculating conditions is shown in FIG. 6. This example relates to an example of the calculation of the yield in a "steel press" process in which the parts combination is used as a factor. In the "steel press" process, in the case of pressing the parts from an iron plate and casting, the yields differ depending on the combination of the parts which are casted from one iron plate. An example of the conditions for proportionally distributing the environmental load amount to the environmental loads per parts by reflecting the yield is shown. The example of the parts combination shown in FIG. 6 will be described in FIG. 7. It is assumed that sizes of original iron plates 71, 72, and 73 from which the parts are casted in the "steel press" process are identical. FIG. 7 shows an example in the case where only two "parts a" are casted from the iron plate 71 among those iron plates, only one "parts d" is casted from the iron plate 72, and one "parts a" and one "parts d" can be casted as a combination from the iron plate 73. Junk parts 74, 75, and 76 are caused in those three cases. Thus, areas of the junk parts caused from the iron plates decrease in order of the iron plates 72, 71, and 73. Therefore, it will be understood that yield ratios increase also in the above order. FIG. 6 shows those yield ratios by numerical values. In a row 61, the yield is equal to 0.7 in the case of casting only the "parts a". In a row 62, the yield is equal to 0.6 in the case of casting only the "parts d". In a row 63, the yield is equal to 0.9 in the case of casting the "parts a" and "parts d" in combination.

The making method of the parts attributes using the parts attribute calculating conditions described above will be explained hereinafter in the description of the environmental load per-parts calculating means 6.

The environmental load per-parts/process storing means 7 will be described with reference to FIGS. 10A and 10B. The environmental load per-parts/process storing means 7 is means for storing a result of the environmental load amount per parts calculated by the environmental load per-parts calculating means 6 on the basis of the environmental loads per process which have been collected by the environmental load per-process collecting means 1. FIG. 10A shows the example of the result obtained by calculating the environmental load amount per parts with respect to "electric power" of the environmental load item. FIG. 10B shows the example of the result obtained by calculating the environmental load amount with respect to "ironstone" of the environmental load item. However, the environmental load items are not limited to them.

The environmental load per-parts calculating means 6 is means for calculating the environmental load values per parts from the environmental loads per process collected by the environmental load per-process collecting means 1 by using the proportional distributing conditions stored in the proportional distributing condition per-parts storing means 2, the parts attributes stored in the parts attribute storing means 3, the manufacturing conditions stored in the manufacturing condition storing means 4, and the parts attribute calculating conditions stored in the parts attribute calculating condition storing means 5. A flow for processes of the environmental load per-parts calculating means 6 is shown in FIG. 8.

In a process 801, among the parts attributes, the parts attributes which are not determined even if the parts is merely specified but are determined in consideration of other conditions such as manufacturing conditions and the like are calculated. On the basis of the manufacturing conditions stored in the manufacturing condition storing means 4 and the parts attribute calculating conditions stored in the parts attribute calculating condition storing means 5, the parts attributes based on the manufacturing conditions are calculated and stored into the parts attribute storing means 3.

As an initializing process of a processing loop, subsequently, in a process 802, a count value of a counter i for reading out the process from the proportional distributing condition per-parts storing means 2 is reset to "0". In a process 803, a count value of a counter j for reading out the environmental load item from the proportional distributing condition per-parts storing means 2 is reset to "0".

In a process 804, the proportional distributing conditions in the environmental load item j of the process i are obtained from proportional distributing condition per-parts storing means 2. In a process 805, whether or not the proportional distributing conditions in the environmental load item j of the process i are NULL is discriminated. If the proportional distributing conditions are not NULL but a proportional distributing process of the environmental loads is necessary, the proportional distributing process of a process 806 is executed. In the case of NULL, the proportional distributing process of the process 806 is skipped and a process 807 follows.

In a process 806, the proportional distributing process in the environmental load item j of the process i obtained in the process 804 is executed and the proportionally distributed environmental loads per parts/process are stored into the environmental load per-parts/process storing means 7. Although various methods for the proportional distributing process are considered, it is assumed here that the value in the proportional distributing condition unit amount which has been processed in each process is obtained on the basis of the number of parts processed in each process and the parts attributes. Specifically speaking, the environmental load amount is obtained by the following equation (1).

$$Bijk = Cijk \times (Bij/\Sigma(Nik \times Cijk)) \qquad (1)$$

where,

Bijk: Environmental load amount of the environmental load item j in the process i of a parts k Cijk: Value of the proportional distributing condition of the environmental load item j in the process i of the parts k Bij: Environmental load amount of the environmental load item j in the process i Nik: The number of processing products in the process i of the parts k In the process 807, the counter j of the environmental load item is increased by "1".

In a process 808, whether or not the proportional distributing process has been finished with respect to all of the environmental load items j in the process i stored in the proportional distributing condition per-parts storing means 2 is discriminated. If the proportional distributing process has been finished with respect to all of the environmental load items in the process i, the processing routine advances to a process 809 and the counter i of the process is increased by "1". If the proportional distributing process is not finished yet, the processing routine is returned to the process 804 and the proportional distributing process is executed with respect to the next environmental load item.

In a process 80a, whether or not the proportional distributing process has been finished with respect to all of the processes i in the proportional distributing condition per-parts storing means 2 is discriminated. If the proportional distributing process has been finished with respect to all of the processes i, the processes of the environmental load per-parts calculating means 6 are finished. If the proportional distributing process is not finished yet, the processing routine is returned to the process 803 and the proportional distributing process is executed with respect to the next process.

A flow of the processes of the environmental load per-parts calculating means 6 described above will be explained with respect to a specific example. In the process 801 for calculating the parts attributes based on the manufacturing conditions, the parts attributes are calculated with respect to the attributes of the parts in which the "manufacturing condition" has been set into the value in the parts attribute storing means 3 shown in FIG. 4 are calculated. For example, since "manufacturing condition" has been set in the rows 44 and 47 of the column 43 in FIG. 4, the parts attributes are calculated with respect to them. From the manufacturing condition storing means 4 in FIG. 5, in a process "steel press" of the column 52, 45000 "parts a" and 5000 "parts d" are processed. From the parts attribute calculating condition storing means 5 in FIG. 6, since the yield in the case where only the "parts a" have been processed is equal to 0.7 and the yield in the case where the "parts a" and the "parts d" have simultaneously been processed is equal to 0.9, it is regarded that the process of the combination of the parts whose yields are high is preferentially processed. It is considered that the 5000 "parts a" among the 45000 "parts a" are processed in combination with the "parts d". Assuming that the yield of 40000 "parts a" is equal to 0.7 and the environmental load amounts of "ironstone" of the "parts a" are averaged per parts, the yield of "ironstone" of the "steel press" process of the "parts a" is equal to 0.72 [(40000 parts×0.7+5000 parts×0.9)÷45000 parts≈0.72]. By processing all of the 5000 "parts d" in combination with the "parts a", the yield of the "parts d" is calculated as 0.9 from the value of the "steel press" yield of the row 63 in FIG. 6.

On the basis of the calculation result, the parts attributes of the calculation result are stored into the parts attribute storing means 3. A state of the parts attribute storing means 3 obtained after the calculation of the parts attributes is shown in FIG. 9. The value 0.72 is stored into the "steel press" yield in the "parts a" of the column 43 and the row 44. The value 0.9 is stored into the "steel press" yield in the "parts d" of the column 43 and the row 47.

In the following description, the state of the parts attribute storing means 3 obtained after the updating shown in FIG. 9 is referred to.

Subsequently, the item of the "steel cutting" process in the environmental load "electric power" in the proportional distributing condition per-parts storing means 2 shown in FIG. 3 is referred to by the count values of the counters i and j set in the processes 802 and 803, "mass" is obtained as a proportional distributing condition in the process 804. In the process 805, since the proportional distributing conditions have been obtained and are not NULL, the processing routine advances to the process 806.

In the process 806, on the basis of the environmental load amount per process in FIG. 2, the manufacturing conditions (the number of processing products per process) in the manufacturing condition storing means 4 in FIG. 5, and the parts attributes in the parts attribute storing means 3 in FIG. 9, the environmental load amount of the environmental load "electric power" in the "steel cutting" process of the parts a is equal to 2 kwh.

$$5(kg) \times (90000(kwh)/(45000(parts) \times 5(kg))) = 2 \text{ kwh}$$

This value is stored into a column 101 and a row 106 corresponding to the "steel cutting" process of the parts a in the environmental load "electric power" in the environmental load per-parts/process storing means 7 shown in FIG. 10A.

Subsequently, the counter j is incremented in order to advance to the process of the next environmental load item "ironstone" in the process 807. The processing routine is returned to the process 804 and the proportional distributing condition "–(NULL)" of the environmental load "ironstone" in the "steel cutting" process is obtained. Since the proportional distributing condition is NULL, the process 806 is skipped in the process 805 and the processing routine advances to the process 807.

In the process 807, the counter j is incremented to the next environmental load item. In the process 808, since the proportional distributing process has already been finished with respect to all of the environmental load items in the "steel cutting" process in the process 808, the counter i of the process is incremented in the process 809. The processing routine advances to "steel press" as a next process of the column 32 in the proportional distributing condition per-parts storing means 2 shown in FIG. 3.

Since the discrimination result of the process 80a is NO, the processing routine is returned to the process 803. The counter j is initialized to the environmental load item and the row 36 corresponding to the environmental load "electric power" in the proportional distributing condition per-parts storing means 2 shown in FIG. 3 is referred to. The proportional distributing condition "mass" in the "steel press" process is obtained in the process 804.

Since the proportional distributing condition is not NULL as a discrimination result of the process 805, the processing routine advances to the process 806. On the basis of the environmental load amount per process in FIG. 2, the manufacturing condition (the number of processing parts per process) in the manufacturing condition storing means 4 in FIG. 5, and the parts attributes in the parts attribute storing means 3 in FIG. 9, the environmental load amount of the environmental load "electric power" in the "steel press" process of the parts a is equal to 1.74 kwh.

$$5(kg) \times (80000(kwh)/(45000(parts) \times 5(kg) + 5000(parts) \times 1(kg))) = 1.74 \text{ kwh}$$

The environmental load amount of the environmental load "electric power" in the "steel press" process of the parts d is equal to 0.35 kwh.

$$1(kg) \times (80000(kwh)/(45000(parts) \times 5(kg) + 5000(parts) \times 1(kg))) = 0.35 \text{ kwh}$$

Those values are stored in the rows 106 and 109 of the column 102 corresponding to the "steel press" process in the environmental load "electric power" in the environmental load per-parts/process storing means 7 shown in FIG. 10A.

In a manner similar to the above, the counter j is incremented in the process 807 in order to advance to the process of the next environmental load item "ironstone". The processing routine is returned to the process 804 and the environmental load "ironstone" in the "steel press" process and the proportional distributing condition "mass÷steel press yield" per such parts are obtained.

Further, since the discrimination result of the process 805 is YES, the processing routine advances to the process 806. The environmental load amount of the environmental load "ironstone" in the "steel press" process of "the parts a" is equal to 4.37 kg.

$$(5/0.72) \times (200000(kg)/(45000(parts) \times 5(kg)/0.72) + 5000(parts) \times 1(kg)/0.9)) = 4.37(kg)$$

The environmental load amount of the environmental load "ironstone" in the "steel press" process of the parts d is equal to 0.70 kg.

$$0.9 \times (200000(kg)/(45000(parts) \times 0.72 + 5000(parts) \times 0.9)) = 0.70(kg)$$

Those values are stored in rows 10h and 10k of a column 10d corresponding to the environmental load "ironstone" in the environmental load per-parts/process storing means 7 shown in FIG. 10B.

Subsequently, as a result of the processes 807, 808, and 809, the processing routine advances to the next "PP cutting" process in the proportional distributing condition per-parts storing means 2.

As a result of execution of the calculating process regarding all of the processes and environmental load items, the environmental load amounts per parts/process are stored into the environmental load per-parts/process storing means 7 as shown in FIGS. 10A and 10B.

Subsequently, the bill of materials (BOM) storing means 8 will be described. The BOM storing means 8 stores the bill of materials (BOM) in which the constructions and the number of the parts constructing the product have been expressed by a tree structure.

Figures 11, 12:
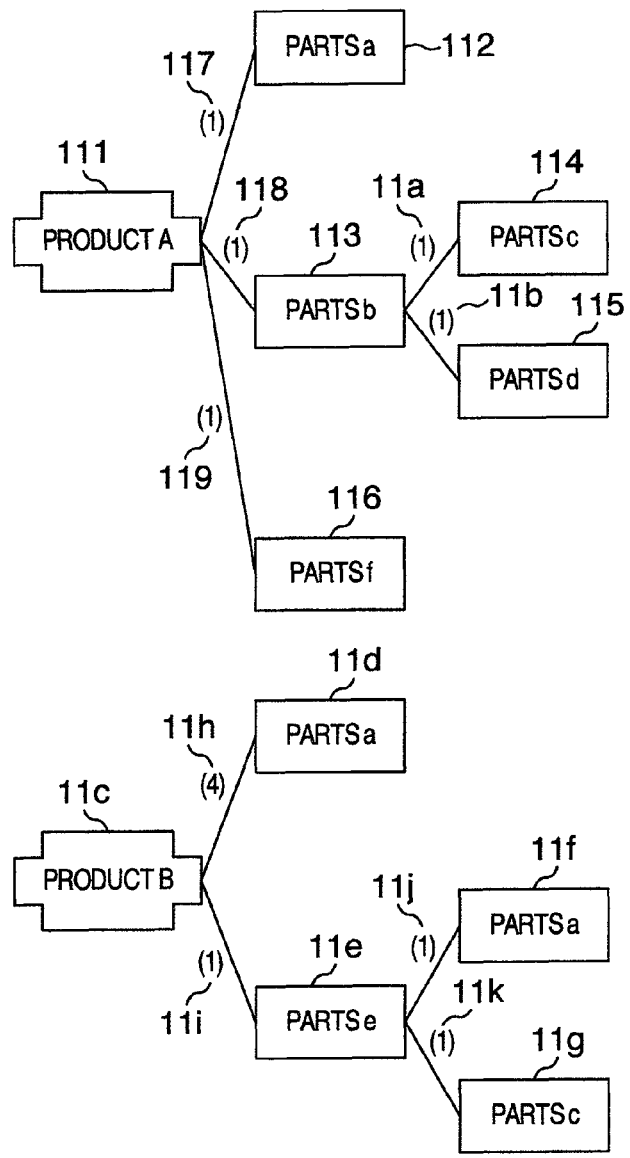
FIG. 11 shows an example of a bill of materials (BOM) which is stored in bill of materials storing means.
FIG. 12 shows an example of items stored in product manufacturing amount storing means.

FIG. 11 shows an example of the bill of materials (BOM) which is stored in the BOM storing means 8. In the diagram, a "product A" 111 is constructed by a "parts a" 112, a "parts b" 113, and a "parts f" 116. Among them, the "parts b" 113 is an assembly parts constructed by a "parts c" 114 and a "parts d" 115.

Similarly, also with respect to a "product B" 11c, each parts constructing the "product B" 11c is expressed by a tree-like construction in which the "product B" 11c is used as a parent. Each of numerals (117 to 11b and 11h to 11k) in parentheses annexed to lines connecting parts having a parent and child relation indicates the number of child parts in the parent and child relation in the tree construction. For example, although the "product A" 111 is constructed by one "parts a" 112, the "product B" 11c is constructed by four "parts a" 11d.

As mentioned above, the BOM which is stored in the BOM storing means 8 includes information showing the kinds and number of parts constructing the product and the kinds of processes (not shown).

The product manufacturing amount storing means 9 is means for storing the number of manufacturing products per product. An example of a manufacturing amount of the products which is stored in the product manufacturing amount storing means 9 is shown in FIG. 12. In this example, it is assumed that 5000 products A and 8000 products B have been manufactured. It is assumed that the product manufacturing amount which is stored in the product manufacturing amount storing means 9 is stored synchronously with the unit time and the unit period of time during which the environmental loads per process are collected by the environmental load per-process collecting means 1. The numbers of products manufactured for the unit time and the unit period of time are stored.

The contribution degree per-product/process evaluating means 10 is means for calculating a contribution degree of the environmental load of the product every process by using the environmental load amount per parts/process calculated by the environmental load per-parts calculating means 6, the BOM stored in the BOM storing means 8, and the product manufacturing amount stored in the product manufacturing amount storing means 9.

Figure 13:
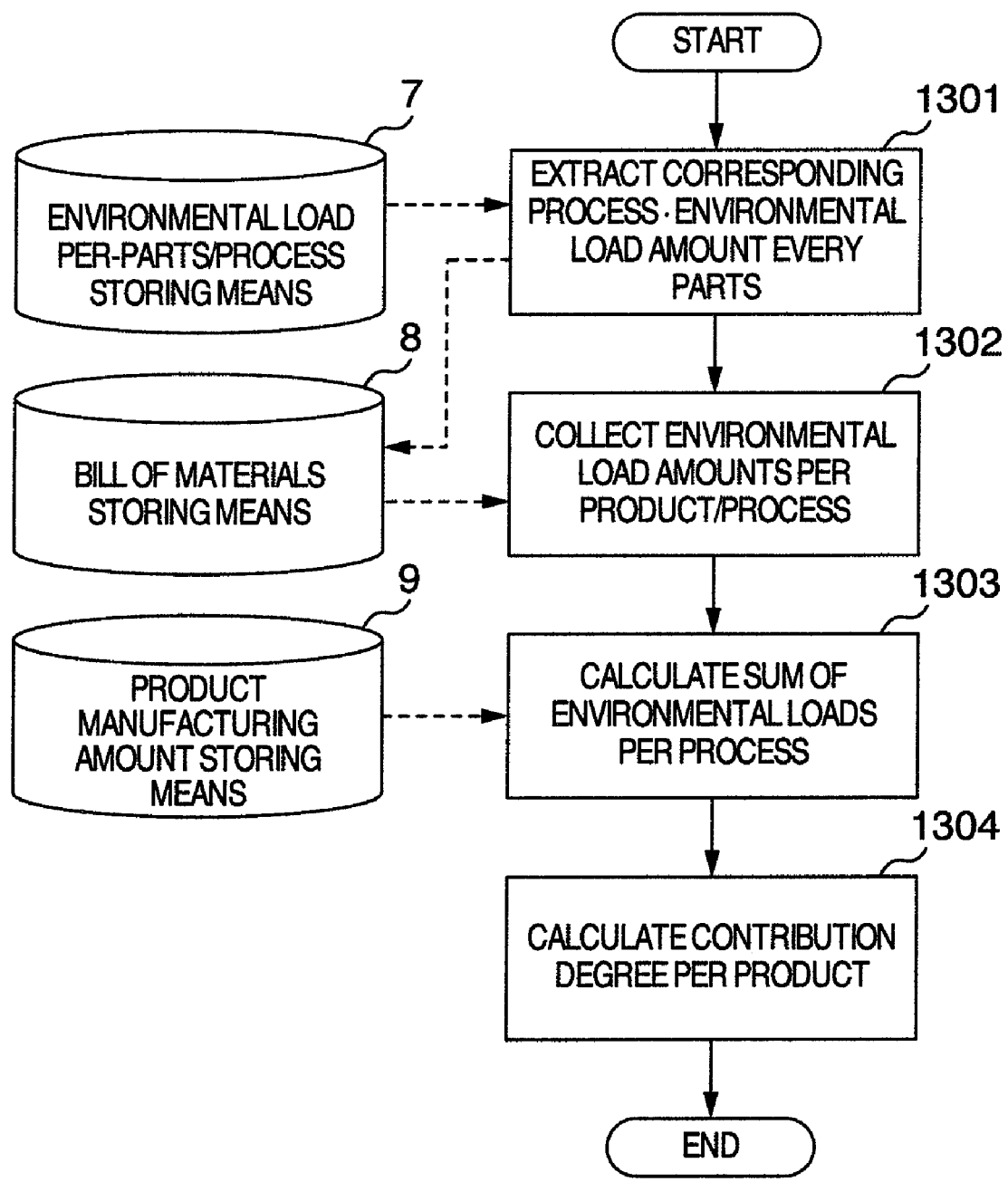
FIG. 13 is a flowchart for describing processes of contribution degree per-product/process evaluating means.

A flow for processes of the contribution degree per-product/process evaluating means 10 is shown in FIG. 13. A process 1301 is such a process that to the parts as component elements constructing the product in each bill of materials (BOM) stored in the BOM storing means 8, a process which is executed to each parts and an environmental load amount of the process are extracted from the environmental load per-parts/process storing means 7 and are made to correspond to the BOM. A state of the BOM after the end of the process 1301 is shown in FIG. 14. In this instance, the process corresponding to each parts in the BOM and the environmental load amount are extracted from the environmental load per-parts/process storing means 7 and are made to correspond as attributes of the parts. Specifically speaking, the parts serving as component elements recorded in the BOM in FIG. 11 are sequentially referred to, the table in the environmental load per-parts/process storing means 7 in FIGS. 10A and 10B is searched with respect to the referred parts, and the process in which the value of the environmental load amount exists and the environmental load amount are made to correspond as attributes of the relevant parts. For example, with respect to the "parts a" 112 in FIG. 11, when it is searched for from a parts name in the table in FIG. 10A, the row 106 corresponds to it. When all processes are searched for with respect to the row 106, the environmental load amounts "2" and "1.74" have been stored with respect to the two processes of "steel cutting" of the column 101 and "steel press" of the column 102, respectively. Therefore, it will be understood that with respect to the "parts a", those two processes exist. The processes of the "steel cutting" 11m and the "steel press" 11l are made to correspond as attributes of the "parts a".

Although the case where only the "electric power" of the environmental load item was made to correspond has been described in the example, all environmental load items may be added as attributes of the parts or the BOM can be also separately expressed every environmental load item.

Figures 15, 16, 17:
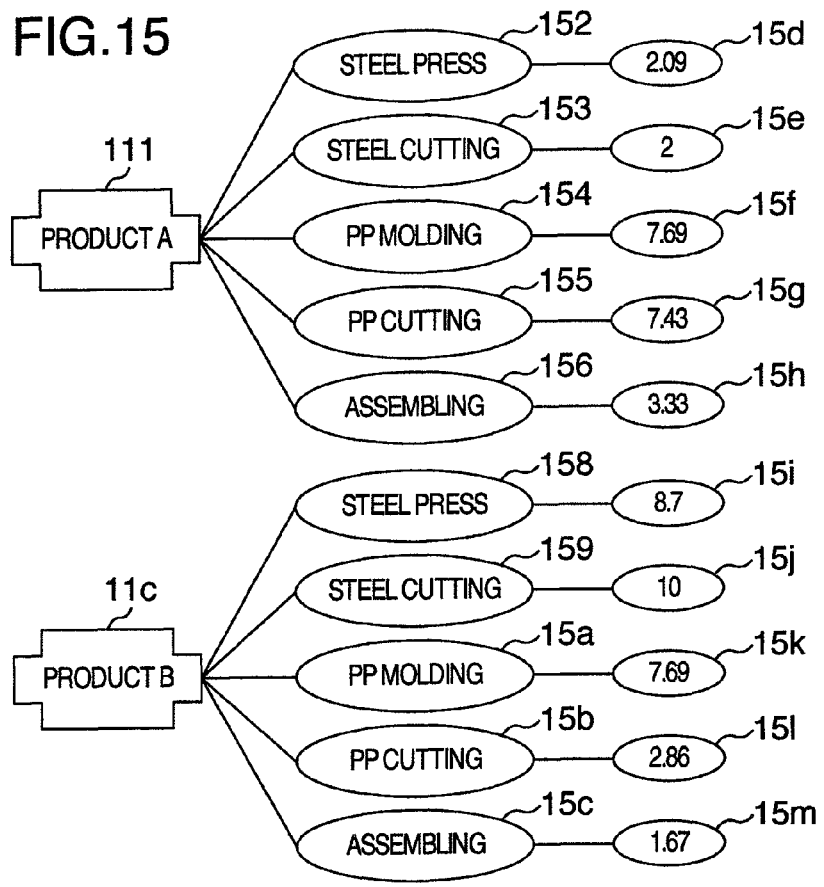
FIG. 15 is a diagram in which an environmental load amount per process has been made to correspond to each product.
FIG. 16 is a diagram showing the environmental load amount per process per product.
FIG. 17 is a diagram showing the sum of environmental load amount per process.

A process 1302 is such a process that by using the BOM in which the process and the environmental load amount have been made to correspond to the parts in the process 1301, the environmental load amounts are collected every product/process, thereby obtaining the environmental load amount per product. A state of the BOM after the end of the process 1302 is shown in FIG. 15. As shown in the diagram, the environmental load amount of each process is collected every product like an environmental load amount of each process (152 to 156) in the "product A" 111 and an environmental load amount of each process (158 to 15c) in the "product B" 11c.

For example, in the "product A" 111 in FIG. 14, the "steel press" process includes a "steel press" 11l which is executed to the "parts a" 112 and a "steel press" 11p which is executed to the parts d (115). In the case of the "parts a" 112 and the parts d (115), since the product is also constructed by one parts with respect to one product, the environmental load amount of the "steel press" process in the "product A" 111 is equal to 2.09 (kwh).

1.74(kwh)+0.35(kwh)=2.09(kwh)

As shown in FIG. 15, 2.09 is obtained as an environmental load amount of a "steel press" 152 in the "product A" 111.

Similarly, for example, in the "product B" 11c in FIG. 14, the "steel press" process includes a "steel press" 11s which is executed to the "parts a" 11d and a "steel press" 11u which is executed to the "parts a" 11f. In this case, since four "parts a" 11d are included in the product B, the environmental load amount of the "steel press" process in the "product B" 11c is equal to 8.7 (kwh).

1.74(kwh)×4(parts)+1.74(kwh)×1=8.7(kwh)

As shown in FIG. 15, 8.7 is obtained as an environmental load amount of a "steel press" 158 in the "product B" 11c. FIG. 16 shows a table showing the collection result per process and per product obtained by the process 1302 as mentioned above, while a product name is shown in a row and the product sum as a total of the process name and the environmental load amounts per product is shown in a column.

A process 1303 is such a process that by multiplying the environmental load amounts per product and per process obtained by the process 1302 every product by the number of manufacturing products per product, the environmental load amounts per process which is obtained in consideration of the number of manufacturing products are calculated. In the example of the product manufacturing amount shown in FIG. 12, since the number of manufacturing products is equal to 5000"products A" and 8000"products B", the environmental load amount obtained by multiplying the environmental load amounts in each process and their product sum of the "product A" in the collection result per product and per process shown in FIG. 16 by the number of manufacturing products (=5000) of the "product A" and the environmental load amount obtained by multiplying the environmental load amounts in each process and their product sum of the "product B" in the collection result per product and per process shown in FIG. 16 by the number of manufacturing products (=8000) of the "product B" are as shown in FIG. 17. Further, an environmental load amount of the whole process obtained by summing the environmental load amounts in respective products every process is stored in a row 173. The sum of the environmental loads of the whole product to which the number of manufacturing products has been reflected is stored in a column 179. A value in each of the row 173 and the column 179 indicates the sum of the environmental load amounts of the whole business.

A process 1304 is a process for obtaining a ratio at which each product contributes to the environmental loads of each whole process on the basis of the environmental loads per product/process obtained in consideration of the product manufacturing amount in the process 1303. The result of the contribution degree calculated in the process 1304 is shown in FIG. 18. For example, with respect to the "steel cutting" process of a column 174 in FIG. 17, the environmental load contribution degree of the "product A" to the "steel cutting" process is equal to 0.11.

10000÷90000=0.11

The environmental load contribution degree of the "product B" to the "steel cutting" process is equal to 0.89.

80000÷90000=0.89

It will be, therefore, understood that the contribution degree of the product to the environmental load amount differs every process as mentioned above.

The contribution degrees of the respective processes to the environmental loads of the whole business are stored into columns 184 to 188 of a row 183. The contribution degrees of the respective products to the environmental loads of the whole business are stored into rows 181 and 182 of a column 189. In this manner, in addition to the contribution degrees per product/process as mentioned above, the contribution degree per process and the contribution degree per product corresponding to the higher order can be also shown simultaneously with them.

The environmental load distribution table per-product/process storing means 11 obtains the distribution results per product and per process with respect to a result of the evaluation of the environmental load made by the contribution degree per-product/process evaluating means 10 and stores an environmental load distribution table per-product/process in which the distribution results are shown in a matrix form. Specifically speaking, the environmental load distribution table per-product/process denotes: a table shown in FIG. 16 in which the environmental load amount per product is shown every process (hereinbelow, referred to as a distribution table per product); a table shown in FIG. 17 in which the environmental load of the whole product/process to which the number of products has been reflected by multiplying the table shown in FIG. 16 by the number of products has been obtained (hereinbelow, referred to as a distribution table per process); and a table shown in FIG. 18 in which the contribution degree of the environmental load per process has been obtained by using the table obtained in FIG. 17 (hereinbelow, referred to as a contribution degree distribution table).

Thus, it is considered that decisions for reducing the environmental loads can be made by, for example, the following procedures.

(Procedure 1)

The process in which a priority of the reduction of the environmental loads is high is specified. For example, the process in which the priority of the environmental load "electric power" is highest is set to a reduction target in order to reduce the environmental load amount in the environmental load "electric power". From the result of the environmental load amount per process collected by the environmental load per-process collecting means 1 shown in FIG. 2, it will be understood that the process in which the environmental load amount in the environmental load "electric power" is largest is the "PP molding". It is assumed that such a process is a process in which the priority of the reduction of the environmental loads is high.

(Procedure 2)

With respect to the process in which the priority of the reduction of the environmental loads is high, the product in which the contribution degree of the environmental load amount is high is set to a reduction target. From the contribution degree distribution table per process shown in FIG. 18, it will be understood that with respect to the "PP molding" process, the contribution degree of the product B is so high to be equal to 0.62 and that a raise in priority of endeavor to reduce the environmental load regarding the "PP molding" of the product B is effective.

Since the contribution degree of each product to the total environmental load amount per process can be known by using the construction of the first embodiment as mentioned above, the priority can be allocated to the reduction targets for reduction of the environmental loads.

Embodiment 2

Figure 33:
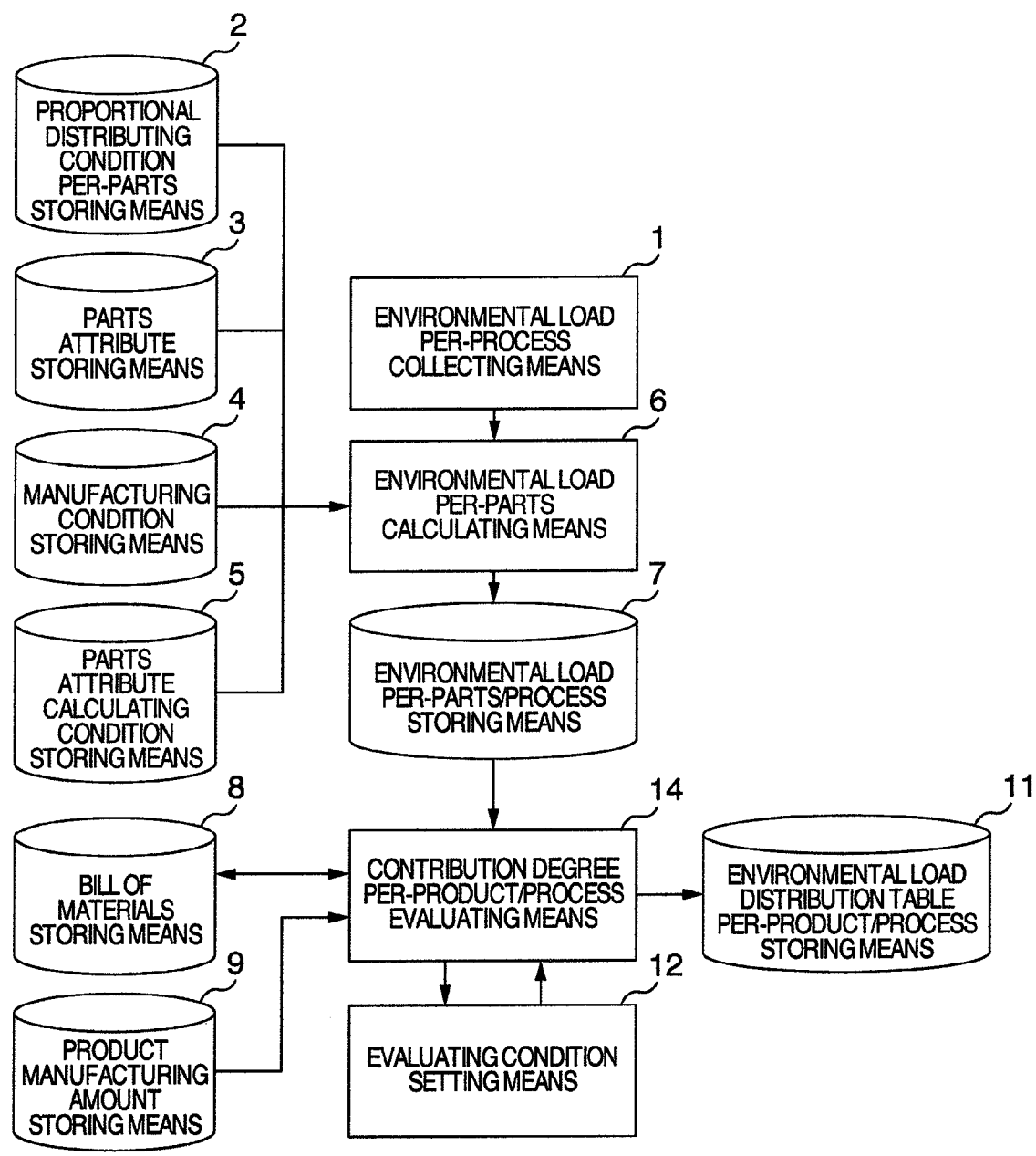
FIG. 33 is a constructional diagram of another embodiment of an apparatus for assisting decisions for improvement of environmental loads according to the invention.

A construction of an embodiment 2 shown in FIG. 33 is obtained by adding evaluating condition setting means 12 to the apparatus for assisting decisions for improvement of the environmental loads of the embodiment 1. In this instance, the environmental loads per product/process are obtained by contribution degree per-product/process evaluating means 14 and a contribution degree to the environmental load per process is calculated. However, each data which has been inputted to the contribution degree per-product/process evaluating means 14 and stored in the environmental load per-parts/process storing means 7, BOM storing means 8, and product manufacturing amount storing means 9 is changed by the evaluating condition setting means 12 and the contribution degrees are evaluated again by the contribution degree per-product/process evaluating means 10, thereby re-evaluating the contribution degrees of the environmental load amounts after the data change and the environmental loads to the whole process.

A flow for processes of the evaluating condition setting means 12 will be described with reference to FIG. 19. An input display screen and an output display screen of the evaluating condition setting means 12 will be described with reference to FIGS. 20, 21, and 25. First, in a process 1901, a selection of conditions including items whose values are changed in order to evaluate the environmental loads is received from the user. That is, the selection is received by such a measure that the conditions or data which can be changed is displayed as a list on an input display screen as shown in FIG. 20 and the user is allowed to select the desired items on the list, or the like. In a process 1902, with respect to the items received in the process 1901, the relevant table is called from the proportional distributing condition per-parts storing means 2, parts attribute storing means 3, manufacturing condition storing means 4, parts attribute calculating condition storing means 5, environmental load per-parts/process storing means 7, BOM storing means 8, and product manufacturing amount storing means 9 and displayed. In the embodiment, on the basis of the "environmental load per-parts/process" as a change item selected in the process 1901, the stored evaluation data is called from the corresponding environmental load per-parts/process storing means 7 and displayed as shown in FIG. 21.

In a process 1903, change contents are received with respect to the value of the displayed evaluating condition. On an input display screen as shown in FIG. 21, the user selects a position where he wants to change the condition from display contents of initial conditions and inputs the value after the change. For example, in the case where the environmental load amount of "steel press" in the "parts a" is changed and its influence is simulated, the environmental load item "electric power" is selected from a pull-down menu 211, a cell 212 corresponding to "steel press" of the "parts a" is selected, the value after the change is inputted into a text box 213, and thereafter, a "change" button 214 is clicked. By such a series of operations, with respect to the environmental load item "electric power", the environmental load amount of "steel press" in the "parts a" is changed to 1.5. The change received here is stored into the contribution degree per-product/process evaluating means 14 or into a work area in each storing means which has called the value before the change. In the subsequent processes, the value after the change is extracted as necessary.

In a process 1904, the contribution degree per-product/process evaluating means 10 is called and an evaluation to which the change contents of the setting condition received in the process 1903 have been reflected is made. By this process, the distribution table per product, distribution table per process, and contribution degree distribution table after the change in evaluating condition can be calculated. Examples of the distribution table per product, distribution table per process, and contribution degree distribution table after the change in environmental load amount shown in FIG. 21 are shown in FIGS. 22, 23, and 24, respectively.

In a process 1905, the distribution table per product, distribution table per process, and contribution degree distribution table after the change in evaluating condition obtained in the process 1904 are compared with the distribution table per product, distribution table per process, and contribution degree distribution table obtained under the initial conditions, respectively. Such a comparison is a process in which the corresponding cells are compared in each of the distribution table per product, distribution table per process, and contribution degree distribution table which have been obtained under the initial conditions and formed as a processing result of the contribution degree per-product/process evaluating means 14, and (1) a comparison result indicates which one of "increase", "there is no change", and "decrease", (2) an increase/decrease amount (value of a difference from the initial value), and (3) an increase/decrease rate (the value of the difference from the initial value/the initial value), and the like are calculated.

In a process 1906, the evaluation result calculated in the process 1904 and the comparison result calculated in the process 1905 are displayed. An example of the display screens is shown in FIG. 25. Among the display screens 251, 252, and 254 shown in FIG. 25, the display screen 251 is an example in which the distribution table per product which has been formed in the process 1904, shown in FIG. 22, and obtained after the change of the setting condition is displayed as it is. The display screen 252 is an example in which the values of the evaluation result of the distribution table per process according to the initial conditions shown in FIG. 17 and the values of the evaluation result of the distribution table per process shown in FIG. 23 and obtained after the evaluating condition was changed are arranged and displayed at upper and lower positions of the same cell in parallel and an increase or decrease of the value obtained in the process 1905 is shown by ∇ (decrease) or Δ (increase). The display screen 254 is an example in which the increase/decrease rate of the value of each cell in the distribution table per process obtained in the process 1905 is displayed.

The conditions at the time of evaluating the environmental loads per product/process are reset by the foregoing processes of the evaluating condition setting means 12 and the environmental load amount under the changed condition is simulated and can be compared with the result evaluated by using the initial conditions based on the collected environmental loads.

Although the example in which the number of change portions in the evaluating conditions is equal to one has been shown in the above embodiment of the evaluating condition setting means 12, it is also possible to similarly receive a plurality of changes in the processes 1901 and 1903 and display the change results. Although the example in which the conditions of the environmental loads per parts/process are changed has been shown in the above embodiment, similarly, even in the case where the constructions of the parts stored in the BOM storing means 8 are changed or the product manufacturing amount stored in the product manufacturing amount storing means 9 is changed, the environmental loads per product/process after the condition change are calculated by similarly executing the processes.

By using the above construction of the embodiment 2, in the case where the number of manufacturing products is changed in the future manufacturing schedule on the basis of the current environmental loads per product/process evaluated in the contribution degree per-product/process evaluating means 14, in the case where the construction of the product is changed according to a design change, in the case where an environmental efficiency of the process is improved owing to a process improvement or the like, or the like, influences which are exerted on the whole product, whole process, and whole business can be evaluated. By setting the current environmental loads into the initial values and evaluating the increase or decrease in environmental load, the increase/decrease rate from the initial values, or the like and comparing and displaying them, the results of comparison with the present situation are clarified, and they can be used as a discrimination result about the decisions for improvement of the environmental loads.

Embodiment 3

Figure 34:
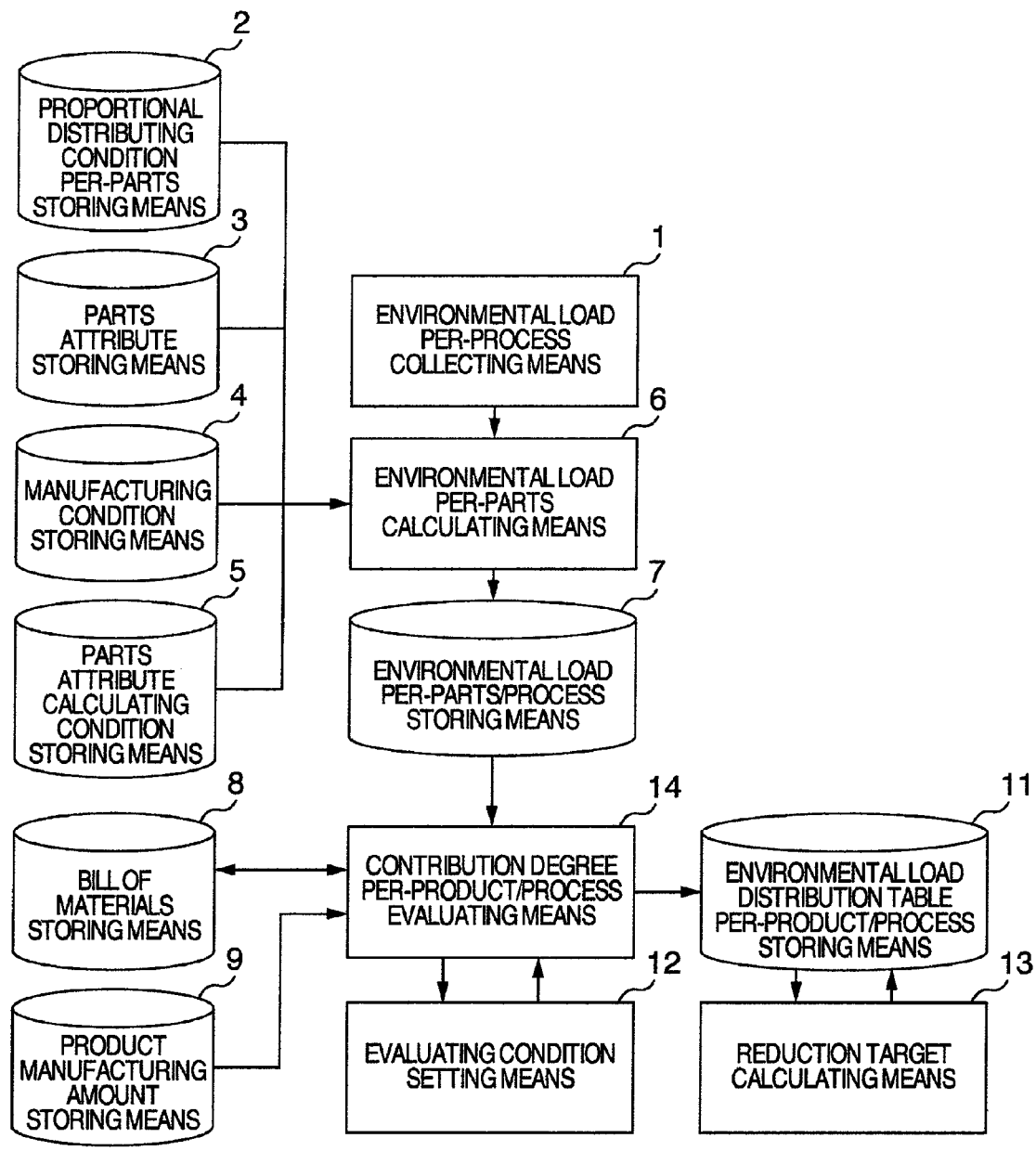
FIG. 34 is a constructional diagram of further another embodiment of an apparatus for assisting decisions for improvement of environmental loads according to the invention.

An embodiment 3 shown in FIG. 34 is realized by adding reduction target calculating means 13 to the apparatus for assisting decisions for improvement of the environmental loads of the embodiment 2. The reduction target calculating means 13 is such means that in the case where a reduction target value of the environmental load is set on a unit basis such as whole product, whole process, or whole business, a reduction amount necessary to reduce the environmental loads per parts/process or the environmental loads per product/process in order to accomplish the reduction target is calculated.

Figure 26:
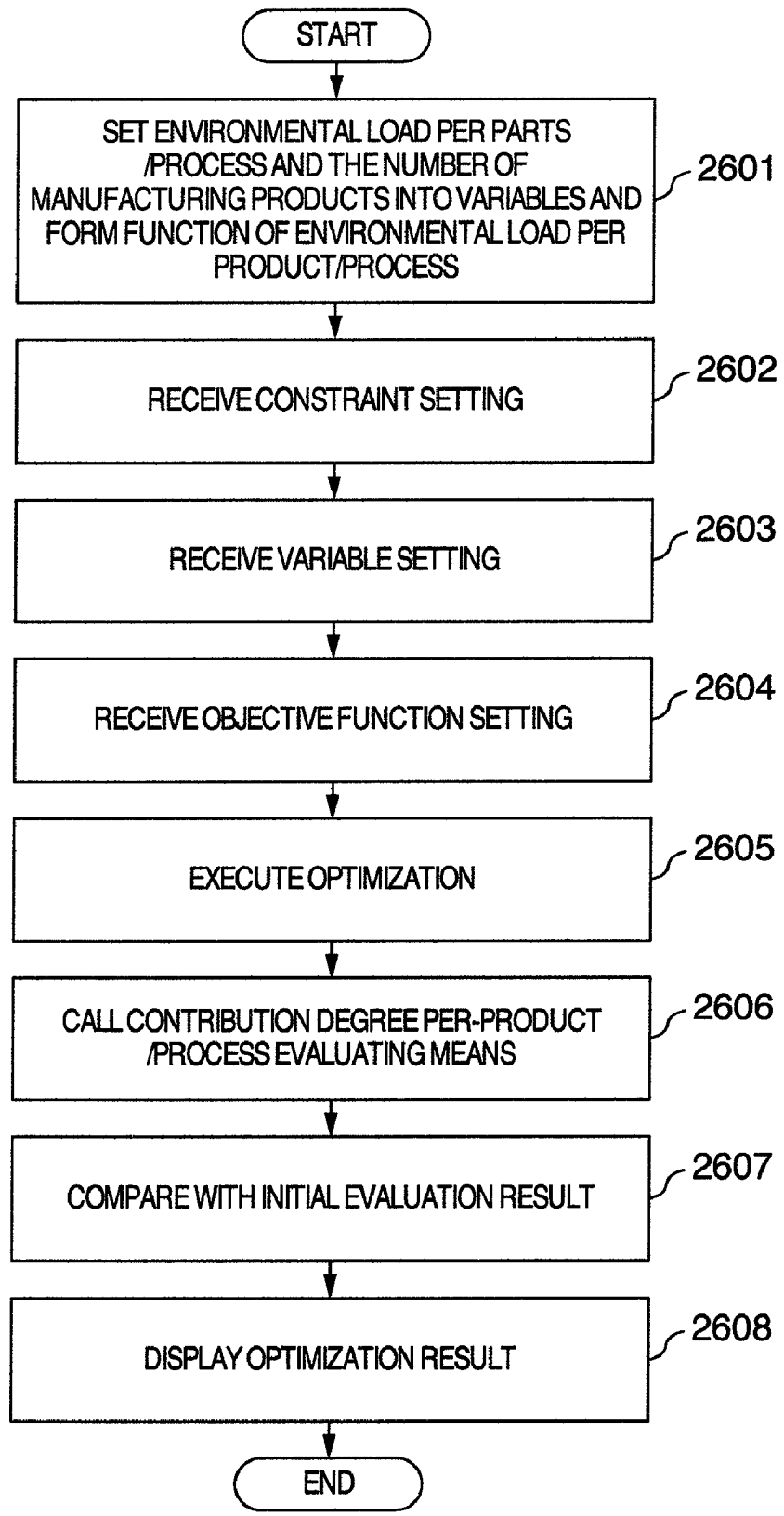
FIG. 26 is a flowchart for describing a flow for processes of reduction target calculating means.

A flow for processes of the reduction target calculating means 13 is shown in FIG. 26. In a process 2601, the environmental loads per parts/process and the number of manufacturing products are used as variables and functions of the environmental loads per product/process are formed by using those variables. The process 2601 will be described with reference to FIG. 27. In FIG. 27, in a table 271, the environmental loads per parts/process are shown by the variables and each combination of the parts name and the process name is shown by the variable shown in each cell of this table. As variables which are formed in the table 271, in tables as shown in FIGS. 10A and 10B stored in the environmental load per-parts/process storing means 7, they may be formed by either a method whereby each variable is formed with respect to a combination of the parts in which the environmental load amount has been set by a value instead of NULL ("–") and the process or a method whereby each variable is formed every correspondence between each parts and the process on the basis of the BOM in which the parts and the processes are made to correspond to each other as shown in FIG. 14. From the tables, for example, the "steel cutting" process of the "parts a" is set to "a1" and the "steel press" process of the "parts a" is set to "a2". As shown in a table 272, the number of manufacturing products per product is also similarly expressed by a variable. For example, the "product A" is shown by the variable "Na" and the "product B" is shown by the variable "Nb".

Further, the parts constructing each product and the number of parts are extracted from a bill of materials (BOM) 273. For example, from a bill of materials (BOM) 274 about the "product A", it will be understood that the "product A" is constructed by one "parts a", one "parts b", one "parts c", one "parts d", and one "parts f".

From the above information, as shown in a table 276, the environmental load amount per product/process is shown by a function using the variable of the environmental load per parts/process in the table 271 and the variable corresponding to the number of manufacturing products in the table 272. For example, as for the environmental load of the "steel cutting" process of the "product A", it will be understood that the environmental load is caused with respect to the "parts a" from the column of the "steel cutting" process in the table 271. In this instance, since the number of "parts a" constructing the "product A" is equal to 1 from the BOM 274 of the "product A", the "steel cutting" environmental load per "product A" is set to "a1", and since the number of manufacturing products of the "product A" is equal to "Na" from the table 272, the environmental load of the "steel cutting" process of the "product A" is equal to "Na×a1".

In the process 2601, the function showing the environmental load per product/process is formed by the procedure as mentioned above.

Figure 28:
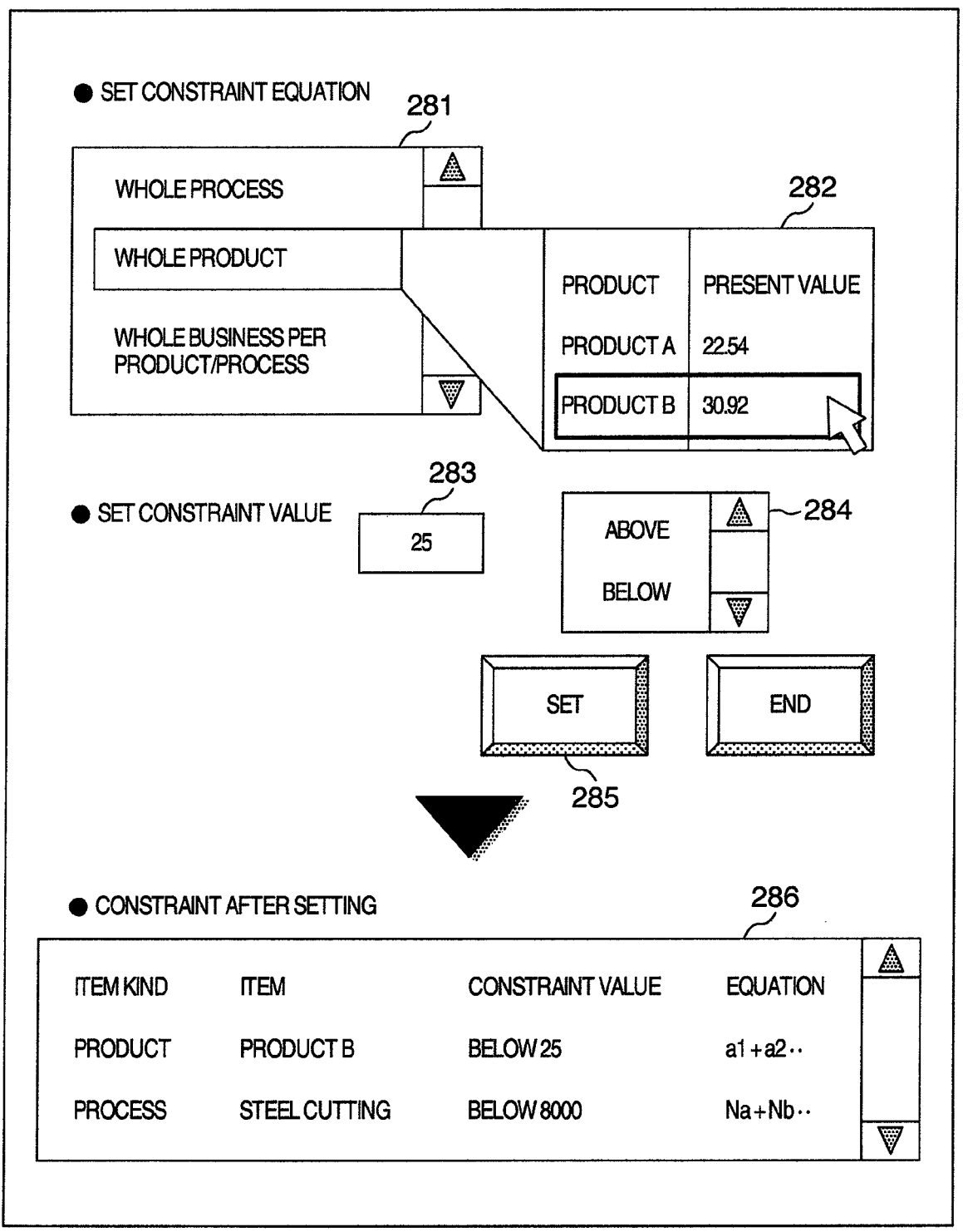
FIG. 28 shows an example of a constraint setting display screen.

In a process 2602, the setting of the constraint from the user is received. The constraint which is set here is a reduction target value of the environmental loads of the whole process, whole product, or the like. An example of a constraint setting display screen is shown in FIG. 28. In the display screen, the user selects a level adapted to set the constraint from a menu 281. As a constraint setting level, the user is allowed to separately select the level with respect to (1) the whole process, (2) the whole product, (3) per product/process, (4) the whole business, and the like. It is now assumed that, in (1) the whole process, the environmental loads of the whole "steel cutting" process corresponding to each cell in a cell range 278 in FIG. 27 and the like are set to the reduction target objects. In (2) the whole product, the environmental loads of the "product B" as shown in each cell in a cell range 279 in FIG. 27 and the like are set to the reduction target objects. In (3) per product/process, a specific process in a specific product such as a "steel cutting" process of the "product A" shown in each cell in a cell range 277 in FIG. 27 and the like are set to the reduction target objects. In (4) the whole business, a totaled value of the environmental loads of the whole business of a cell 27a in FIG. 27 is set to the reduction target object.

The item selected from the menu 281 is received and the list corresponding to the item selected from the table 276 of the environmental load amount per product/process expressed by the function shown in FIG. 27, the distribution table per product stored in the environmental load distribution table per-product/process storing means 11, and the like is displayed by a pull-down menu 282. In the case of an example shown in a display screen of FIG. 28, as a level for setting the constraint, since the "whole product" is selected from the menu 281 and the "product B" is selected from the pull-down menu 282, the constraint is set into the environmental load in the whole "product B". Therefore, a new constraint value is inputted to a text box 283 and either "above" the constraint value or "below" the constraint value is selected in a combobox 284. By clicking a "set" button 285, the constraint selected by the series of operations is added to a list of selected constraint 286. The target to which the constraint is set is not always limited to the unit of the single cell in the table 276 in FIG. 27 but, for example, the constraint value can be also set on a plural-cell unit basis such as a unit in which the sum of the environmental load amounts of "steel cutting" and "steel press" is "below 100000", or the like.

Figure 29:
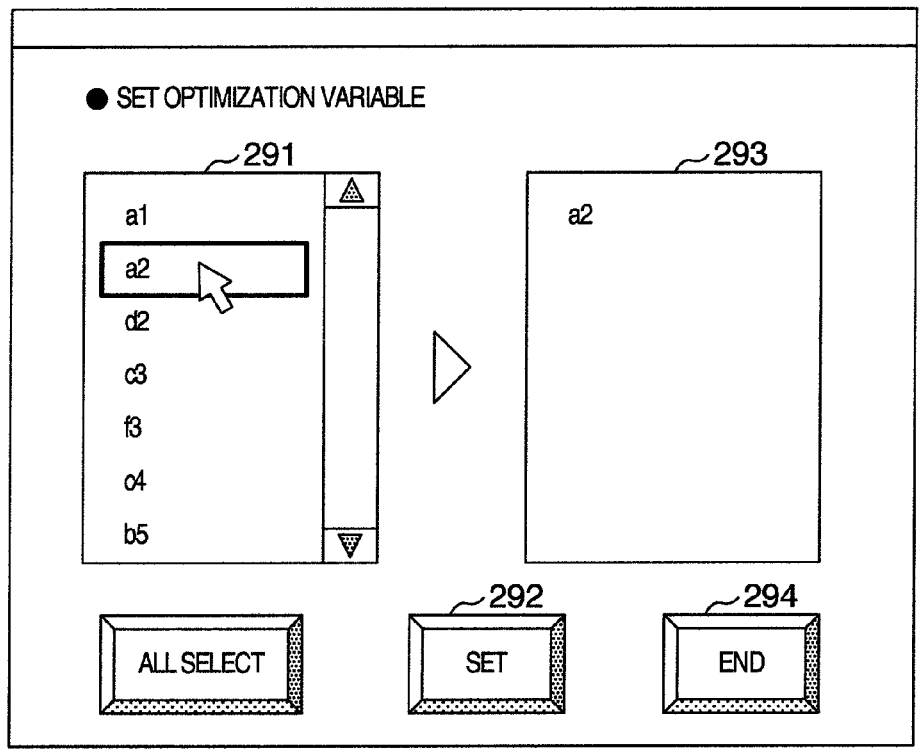
FIG. 29 shows an example of an optimization variable setting display screen.

In a process 2603, the setting of a variable to be optimized is received. The variable which is set to an optimization variable is set among the variables included in the constraint set in the process 2602. An example of a display screen for setting the variable to be optimized is shown in FIG. 29. It is assumed that the variables included in the set constraint are displayed on a list 291 of the setting display screen. The user selects the variable to be set to the optimization variable from the list and clicks a "set" button 292, so that the variable after the setting is displayed in a window 293. After completion of the setting of the optimization variable, by clicking an "end" button 294, the selection of the variable which is used for the optimization is finished. Among the variables included in the constraint, with respect to the variable which is not selected by this setting display screen and is not optimized, it is assumed that a constant is substituted for such a variable, the user is allowed to input the constant by using another constant inputting display screen (not shown) or the like, and it is received. The initial value of the variable stored in the environmental load per-parts/process storing means 7 can be also used as a constant as it is.

Figure 30:
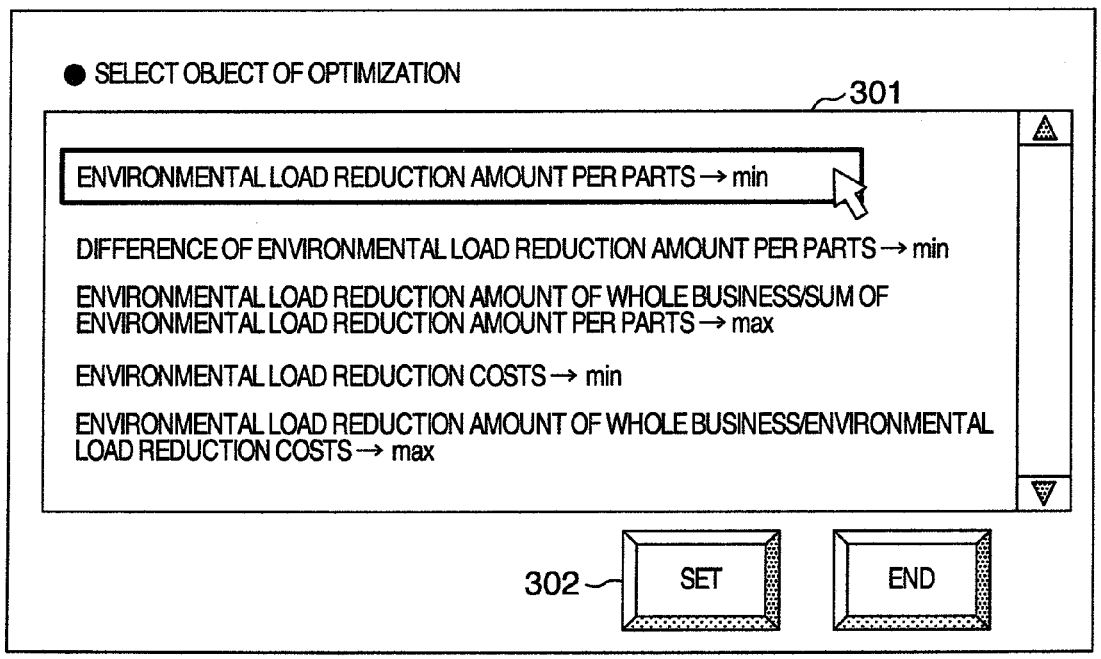
FIG. 30 shows an example of an objective function setting display screen.

In a process 2604, the setting of an objective function is received. An example of an objective function setting display screen is shown in FIG. 30. In the embodiment, several available objective functions are prepared as objective functions and the user is allowed to select a desired one of them, thereby setting the objective function. As objective functions, for example, the following functions are considered: (1) the sum of the environmental load reduction amount per parts is minimized; (2) a dispersion value of the environmental load reduction amount per parts is minimized; (3) (the whole environmental load reduction amount÷the sum of reduction amount per parts) is maximized; (4) the environmental load reduction costs are minimized; (5) (the environmental load reduction amount of the whole business÷the environmental load reduction costs) is maximized; and the like. (1) is an objective function for obtaining a solution which satisfies the constraint at the minimum reduction amount. (2) is an objective function for minimizing a difference between the reduction amounts if the variables and uniformly reducing the environmental loads. (3) is an objective function for maximizing a reducing efficiency of the environmental load amount of the whole business. (4) and (5) are objective functions for defining the environmental load reduction costs per parts. (4) is an objective function for minimizing the costs. (5) is an objective function for maximizing an investment-to-effect ratio. One of the objective functions is selected from a menu 301 in accordance with the optimization object and set by clicking a "set" button 302.

In a process 2605, an optimizing process is executed on the basis of the objective function set by the process 2604. It is assumed that the following constraints as shown in, for example, FIG. 31 have been set in the process 2602: the environmental load of the "steel cutting" process is "below 80000" for a cell 311 corresponding to the total environmental load amount of the "steel cutting" process; the environmental load of the "PP molding" process is "below 89970" for a cell 312 corresponding to the total environmental load amount of the "PP molding" process; and the environmental load of the "product B" is "below 25" for a cell 313 corresponding to the total environmental load amount of the "product B". Assuming that the number of manufacturing products is set to the value shown in FIG. 12 as an initial value and the environmental load per parts/process is set as a variable as shown in FIG. 27, the constraints are expressed as follows by variables a1, a2, c3, c4, and e5.

$$a1 \times 45000 \leqq 80000$$

$$c4 \times 13000 \leqq 89970$$

$$5 \times a1 + 5 \times a2 + c3 + f3 + c4 + e5 \leqq 25$$

In the process 2604, for example, it is assumed that the objective function for minimizing the reduction amount from the initial value has been selected and the initial value of the environmental load amount per parts/process is equal to a value shown in FIG. 32, the objective function is as follows.

$$(2-a1)+(1.74-a2)+(2.86-c3)+(7.69-c4)+(1.67-e5) \rightarrow \min.$$

However, it is assumed that the environmental load amount per parts/process does not increase and $a1 \leqq 2$, $a2 \leqq 1.74$, $c3 \leqq 2.86$, $c4 \leqq 7.69$, and $e5 \leqq 1.67$.

By executing the optimizing process on the basis of the above formularization by using an optimizing method such as linear programming or the like, the environmental load per parts/process can be obtained like, for example, a1=0.97, a2=1.74, c3=2.86, c4=6.92, and e5=1.67 (it is assumed that those values are imaginary values for explanation).

In a process 2606, the contribution degree per-product/process evaluating means 14 is called, an evaluation to which the environmental load amount per parts/process optimized by the process 2605 has been reflected is made, and the environmental load distribution table per product/process is formed. By this process, the environmental load distribution table per product/process (the distribution table per product, distribution table per process, and contribution degree distribution table) based on the environmental load amount per parts/process obtained by the optimization is calculated.

In a process 2607, a result of the evaluation made in the process 2606 is compared with the evaluation result under the initial conditions in a manner similar to the process 1905 described in the embodiment 2. The process 2607 is such a process that the distribution table per product, distribution table per process, and contribution degree distribution table formed by the contribution degree per-product/process evaluating means 14 under the initial conditions are compared with the distribution table per product, distribution table per process, and contribution degree distribution table based on the environmental load amount per parts/process obtained by the optimization, respectively, and the increase/decrease of the value in each item or the increase/decrease rate from the initial value, or the like is calculated.

In a process 2608, the environmental load amount per parts/process obtained as a result by the optimization executed in the process 2605, the distribution table per product, distribution table per process, and contribution degree distribution table obtained as a result by the optimization evaluated in the process 2606, and the comparison results of them in the process 2607 are displayed.

Examples of the display screen are shown in FIGS. 35 and 36. A value (352) of the objective function obtained as a result of the optimization is displayed as shown in a display screen 351 of FIG. 35. The user is allowed to select a table for displaying the result optimized from a pull-down menu 353. A kind of values which are displayed in the selected table is selected in a pull-down menu 354. In the example of the display screen 351, the user has selected a mode for displaying the optimum value obtained as a result of the optimization. The optimization result is displayed in the displayed table as shown in a cell 355. At this time, a display method whereby the values of the items used as variables upon optimization are displayed in an emphasized form or the like as shown in the cell 355 can be also used.

As shown in a cell 357 in a display screen 356, when the kind of values which are displayed in the table is selected, by selecting the mode for displaying the initial value and the optimum value, the initial value before the optimization and the value as an optimized result can be also arranged and displayed at upper and lower positions in parallel. At this time, they can be also displayed with a symbol such as $\nabla$ (decrease), $\Delta$ (increase), or the like on the basis of the increase or decrease of the value of each item. As shown in a display screen 358, when the kind of values which are displayed in the table is selected, by selecting the mode for displaying the values of the reduction amount and the reduction ratio, the reduction amount and the reduction ratio of the environmental load compared with the initial value can be also arranged and displayed at upper and lower positions in parallel.

FIG. 36 shows a display screen 361 as an example in which the distribution table per product in the environmental load distribution table per product/process calculated in the process 2606 is displayed. In a manner similar to the display of the optimized result shown in FIG. 35, by selecting the mode for displaying the initial value and the optimization value, an evaluation value based on the initial value before the optimization and an evaluation value obtained by the optimization are arranged and displayed at upper and lower positions in parallel in each item in a distribution table per product 362. As shown in a cell 363, by emphatically displaying the environmental load amount corresponding to the item in which the constraint has been set in the process 2602 and arranging and displaying its constraint value (364) in parallel, the user can confirm that the optimized result satisfies the constraint. Similarly, as shown in a display screen 365, by displaying the distribution table per process as an evaluation result and selecting the mode for displaying the optimization value and the reduction ratio of the environmental load amount by a pull-down menu 367, the evaluation result of the environmental load amount and the reduction ratio from the initial value can be also arranged and displayed at upper and lower positions in parallel. At this time, it is possible to emphatically display the environmental load amount corresponding to an item (368) in which the constraint has been set in the process 2602 and to arrange and display its constraint value in parallel (369).

Subsequently, an example in the case where the objective function for optimization is set to the function for minimizing the environmental load reduction costs will be described. Besides the environmental load, environmental load reduction costs in each process per parts as shown in FIG. 37 have been preset. It is assumed that their values are stored in the reduction target calculating means 13. Those costs may be set by successively storing the values of the relevant items in an interlocking relational manner with a cost management system or the like in the enterprise, or such a form that the user is allowed to input the values of the costs of the items may be used. A value of each cell in a table shown in FIG. 37 indicates costs which are required to reduce the environmental load amount with respect to the process concerned with the manufacturing step of a certain parts. The costs at the time of reducing the environmental load amount by one are shown by a constant here. For example, FIG. 37 shows that each of the "steel cutting" and "steel press" processes are concerned with the manufacturing of the "parts a" and, upon manufacturing of the "parts a", costs of "Ca1" and "Ca2" are required to reduce the environmental load amount due to each process.

The constraint and variables are substantially the same as those in the example regarding the cell 311 shown in FIG. 31. Assuming that the initial value of the environmental load amount per parts/process is as shown in FIG. 32, the environmental load reduction costs are equal to the following value.

$$Ca1 \times (2-a1) + Ca2 \times (1.74-a2) + Cc3 \times (2.86-c3) + Cc4 \times (7.69-c4) + Ce5 \times (1.67-e5)$$

Now, assuming that the value of the costs is as shown in FIG. 38, the objective function is as follows.

$$2 \times (2-a1) + 3 \times (1.74-a2) + 0.5 \times (2.86-c3) + 1 \times (7.69-c4) + 0.1 \times (1.67-e5) \rightarrow \min$$

By executing the optimizing process by using the above objective function, the environmental load per parts/process in which the environmental load reduction costs are minimum can be obtained in a manner similar to that of the foregoing embodiment.

As mentioned above, by using the construction of the third embodiment, the reduction target value of the environmental load at a macro level such as product unit, process unit, or the like is set in consideration of the present environmental loads and an amount of environmental load which should be reduced at the level of each process per parts in order to accomplish the reduction target can be obtained by using the optimization. The president or environmental administrator determines a macro reduction target on the basis of the environmental restriction, product strategy, or the like and can use it as a reference for assisting decisions at the time of making an environmental load reduction schedule in the design/manufacturing site on the basis of the macro reduction target.

By variably changing the objective function for optimization, in the case where the user wants to minimize the investment, in the case where he wants to minimize the difference between the reduction amounts per division, or the like, the optimization according to the object is executed and the reduction target value of the environmental load per parts/process can be obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus for assisting decisions for improvement of environmental loads, comprising:
    environmental load per-process collecting means for collecting an environmental load amount every process for a predetermined collecting period of time;
    parts attribute storing means for storing parts-peculiar attributes including mass and a parts manufacturing yield;
    proportional distributing condition per-parts storing means for storing the parts-peculiar attributes, as a proportional distributing condition, which are used for a process for proportionally distributing the collected environmental load amount per process every parts;

manufacturing condition storing means for storing manufacturing conditions constructed by a manufacturing amount per parts of each process corresponding to said collecting period of time;

parts attribute calculating condition storing means for storing calculating conditions of the parts attributes which are decided by a combination of the parts to be manufactured among said manufacturing conditions;

environmental load per-parts calculating means for calculating the environmental load amount per parts on the basis of said environmental load amount per process, said proportional distributing conditions, said parts-peculiar attributes, said manufacturing conditions, and said parts attribute calculating conditions;

environmental load per-parts/process storing means for storing said environmental load amount per parts as an environmental load amount per process of each parts;

bill of materials (BOM) storing means for storing a bill of materials (BOM) which can specify the parts constructing the product and the process that is made to correspond to each of said parts;

product manufacturing amount storing means for storing a manufacturing amount of the products manufactured for said collecting period of time;

contribution degree per-product/process evaluating means for collecting the environmental load amount per process of each product per product on the basis of the environmental load amount per process of each of said parts and said BOM, calculating an environmental load amount per process of each product by multiplying said collected environmental load amount by said manufacturing amount of the products, and calculating a contribution degree of each product to the environmental load amount of each process; and environmental load distribution table per-product/process storing means for storing a distribution table of the environmental load per product every process on the basis of said contribution degree.

2. An apparatus according to claim 1, further comprising evaluating condition setting means for changing a value of at least one of a value of said environmental load amount per process of each parts stored in said environmental load per-parts/process storing means, the parts constructing the product in said BOM stored in said BOM storing means or the process which is made to correspond to each of said parts, and the manufacturing amount of said products stored in said product manufacturing amount storing means, and wherein the environmental load amount per process of each product is calculated by said contribution degree per-product/process evaluating means by using the value changed by said evaluating condition setting means as an input, and the contribution degree of each product to the environmental load amount of each process is calculated.

3. An apparatus according to claim 2, wherein the environmental load amount per process of each product calculated by using the value changed by said evaluating condition setting means as an input is compared with the environmental load amount per process of each product obtained on the basis of the value before it is changed.

4. An apparatus according to claim 2, further comprising reduction target calculating means for setting the environmental load amount per process of each product as a variable, forming a function based on said variable showing the environmental load amount per product, setting an upper limit of said environmental load value with respect to a collection unit of the environmental load amount, and obtaining an upper limit of said environmental load amount per process of each product by an optimizing method.

5. An apparatus according to claim 1, wherein said environmental load per-parts calculating means calculates the environmental load amount per parts by a proportional distributing ratio that is determined by the parts attributes which are calculated by the combination of the parts which are simultaneously processed by the process.

* * * * *